(12) United States Patent
Sakurai et al.

(10) Patent No.: US 6,520,065 B2
(45) Date of Patent: Feb. 18, 2003

(54) CYLINDER AND POSITION DETECTING SENSOR

(75) Inventors: Koji Sakurai, Koshigaya (JP); Yasunaga Suzuki, Saitama-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 51 days.

(21) Appl. No.: 09/795,348

(22) Filed: Mar. 1, 2001

(65) Prior Publication Data

US 2001/0018862 A1 Sep. 6, 2001

(30) Foreign Application Priority Data

Mar. 1, 2000 (JP) .................................... 2000-056437
Mar. 1, 2000 (JP) .................................... 2000-056440

(51) Int. Cl.$^7$ .............................................. F01B 25/26
(52) U.S. Cl. ...................................... 92/5 R; 92/169.1
(58) Field of Search ...................... 91/1; 92/5 R, 169.1, 92/177

(56) References Cited

U.S. PATENT DOCUMENTS

| | | | | |
|---|---|---|---|---|
| 4,793,241 A | * | 12/1988 | Mano et al. | 92/5 R |
| 4,924,758 A | * | 5/1990 | Yuda | 92/169.1 |
| 5,256,840 A | * | 10/1993 | Pirhadi | 92/5 R |
| 5,680,808 A | * | 10/1997 | Day et al. | 92/169.1 |

* cited by examiner

*Primary Examiner*—Edward K. Look
*Assistant Examiner*—Thomas E. Lazo
(74) *Attorney, Agent, or Firm*—Paul A. Guss

(57) ABSTRACT

A cylinder tube of a cylinder has an outer periphery, as taken in the circumferential direction thereof but excepting the upright surface thereof, comprising: surfaces curved convexly outward, and first to third chamfered portions, and a casing of a position detecting sensor to be mounted on the cylinder has an outer periphery formed of surfaces curved convexly outward and a chamfered portion, thereby it is possible to prevent a liquid from being trapped on the outer surface for avoiding the sanitary problem.

15 Claims, 32 Drawing Sheets

CYLINDER AND POSITION DETECTING SENSOR

BACKGROUND OF THE INVENTION

1. Field of the Invention

The present invention relates to a cylinder and a position detecting sensor, which makes it possible to prevent a liquid from being trapped on an outer surface of the cylinder thereby to avoid a sanitary problem.

2. Description of the Related Art

A hydraulic cylinder has heretofore been used as drive means for transferring and positioning workpieces or for driving various industrial machines. The hydraulic cylinder is provided with a cylinder tube and accessories including a switch attached to the cylinder tube, so as to meet various needs of a user, for example, so as to reduce the size and carry out various functions such as option setting. As a result, the hydraulic cylinder has a complicated contour.

However, when the conventional hydraulic cylinder described above is assembled in a food processing machine or the like, the complicated structure of the cylinder is liable to trap a liquid in the irregular surface such as a groove in the cylinder tube or a ridge or a rail for mounting a switch, after a rinsing or sterilizing operation with water or the like essential for the food processing machine. The residence of the liquid or the like in the irregular surface will result in multiplication of various germs. Thus, there is a sanitary problem caused by breeding of the various germs in the foods or workpieces of the food processing machine.

For this reason, there is a strong demand for a sanitary cylinder tube which makes it possible to prevent a liquid from residing on the outer surface by allowing the liquid to naturally fall down in drops.

Further, as with the hydraulic cylinder, a switch which is attached to the hydraulic cylinder for detecting the position of a reciprocating piston has the same sanitary problem.

The conventional switch (or the position detecting sensor) is desirably set at an arbitrary position on its stroke, for the usability of the hydraulic cylinder. The size of the switch has been reduced according as the size reduction of the hydraulic cylinder. In other industrial fields, the hydraulic cylinder body can be easily grooved thanks to the development in technique for molding an extruding member or the like. One method adopted for mounting the switch position adjusting mechanism is to mount the switch on the rail or groove formed on the hydraulic cylinder body by means of screws for enabling the size reduction and simple position adjustment.

Another conventional method is to fix the switch on the hydraulic cylinder body by winding a band directly around the outer periphery of a cylinder tube.

However, when the aforementioned conventional switch is attached to the hydraulic cylinder for use in conjunction with a food processing machine, the complicated shape of the switch invites the residence of the liquid. Therefore, as with the hydraulic cylinder, there is a strong demanded for a switch which has a high draining (dehydrating) ability of allowing the liquid to naturally fall in drops while retaining the conventional position detecting function.

Moreover, some switches attached to the cylinder tube are equipped with a detecting position adjusting mechanism capable of displacing the position of the piston to be detected. However, as compared with a switch having no detecting position adjusting mechanism, the conventional switch has a larger switch body since the detecting position adjusting mechanism is provided. Therefore, in the conventional switch, it is difficult to reduce its size and weight.

SUMMARY OF THE INVENTION

A general object of the invention is to provide a cylinder comprising a cylinder tube having the outer periphery formed of outwardly (convexly) curved surfaces expect upright surfaces and having chamfered portions so as to prevent a liquid from being trapped on the outer surface thereby to avoid sanitary problems.

A main object of the invention is to provide a position detecting sensor comprising a body having the outer periphery formed of curved portions curved convexly outward, and chamfered portions so as to prevent a liquid from being trapped on the outer surface thereby to avoid sanitary problems.

Another object of the invention is to provide a position detecting sensor which makes it possible to provide a detection position adjusting mechanism without enlarging a sensor body so as to reduce the size and weight thereof.

Still another object of the invention is to provide a cylinder which can reliably block invasion of a liquid or the like from the outside through a joint portion between a cylinder tube and a cover member.

The above and other objects, features and advantages of the present invention will become more apparent from the following description when taken with reference to the accompanying drawings, in which the preferred embodiments of the invention are shown by way of illustrative examples.

DESCRIPTION OF THE PREFERRED EMBODIMENTS

Figure 1:
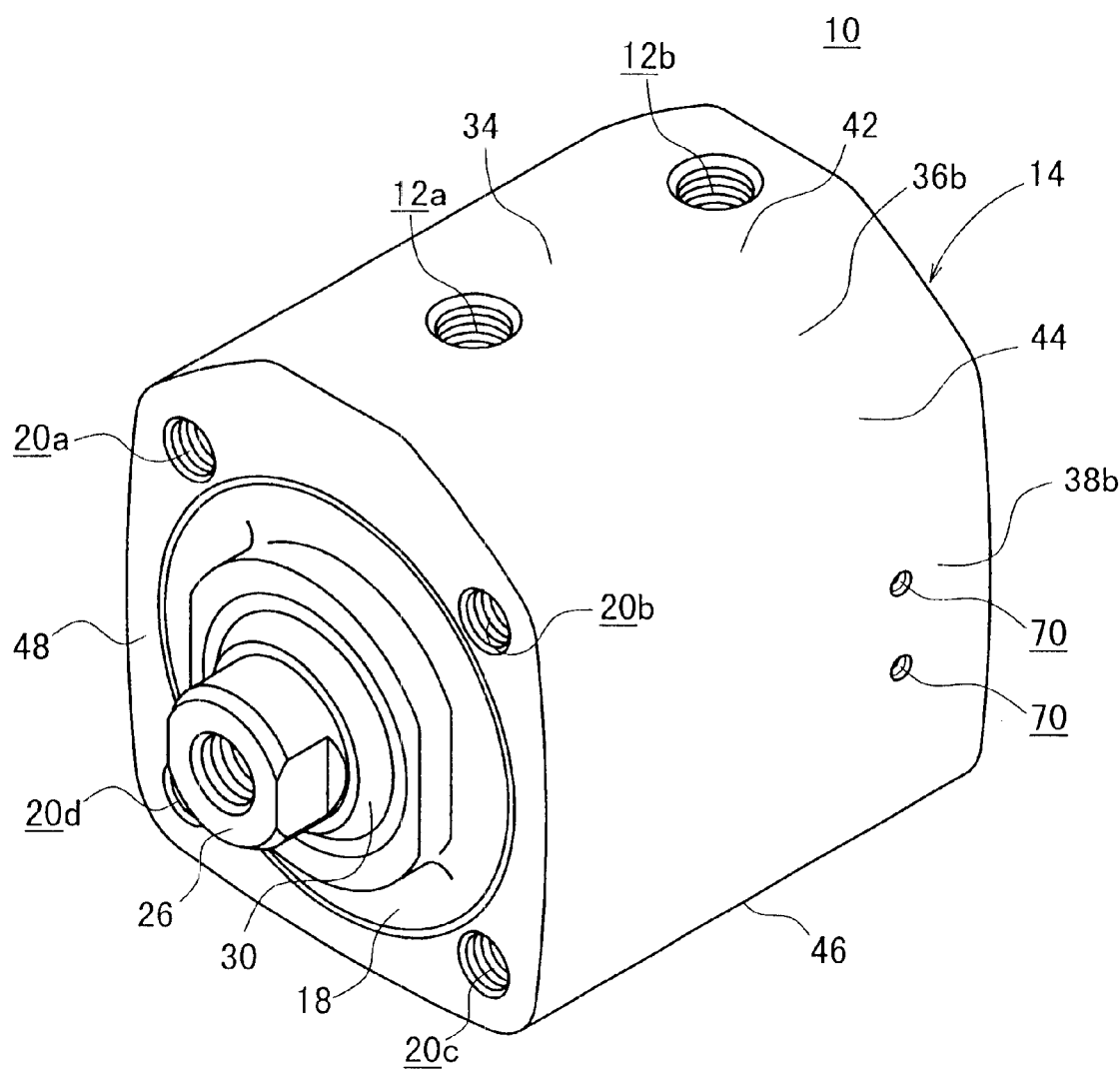
FIG. 1 is a perspective view of a cylinder according to an embodiment of the invention.

The description will be made at first on a cylinder according to an embodiment of the invention and subsequently on position detecting sensors mounted on the cylinder according to embodiments of the invention.

The cylinder, designated by reference numeral 10, comprises a substantially cylindrical cylinder tube 14 having a pair of pressurized fluid inlet/outlet ports 12a and 12b spaced at a predetermined distance, a head cover 16 fixed on one end of the cylinder tube 14, and a rod cover 18 fitted in a threaded hole on the other end of the cylinder tube 14.

In this cylinder tube 14, there are four mounting holes 20a to 20d extending in the axial direction. The cylinder 10 can be conveniently mounted on a wall surface or the like either by fastening unillustrated screw members in threaded portions of mounting holes 20a to 20d or by fastening unillustrated bolts in the mounting holes 20a to 20d.

Figure 3:
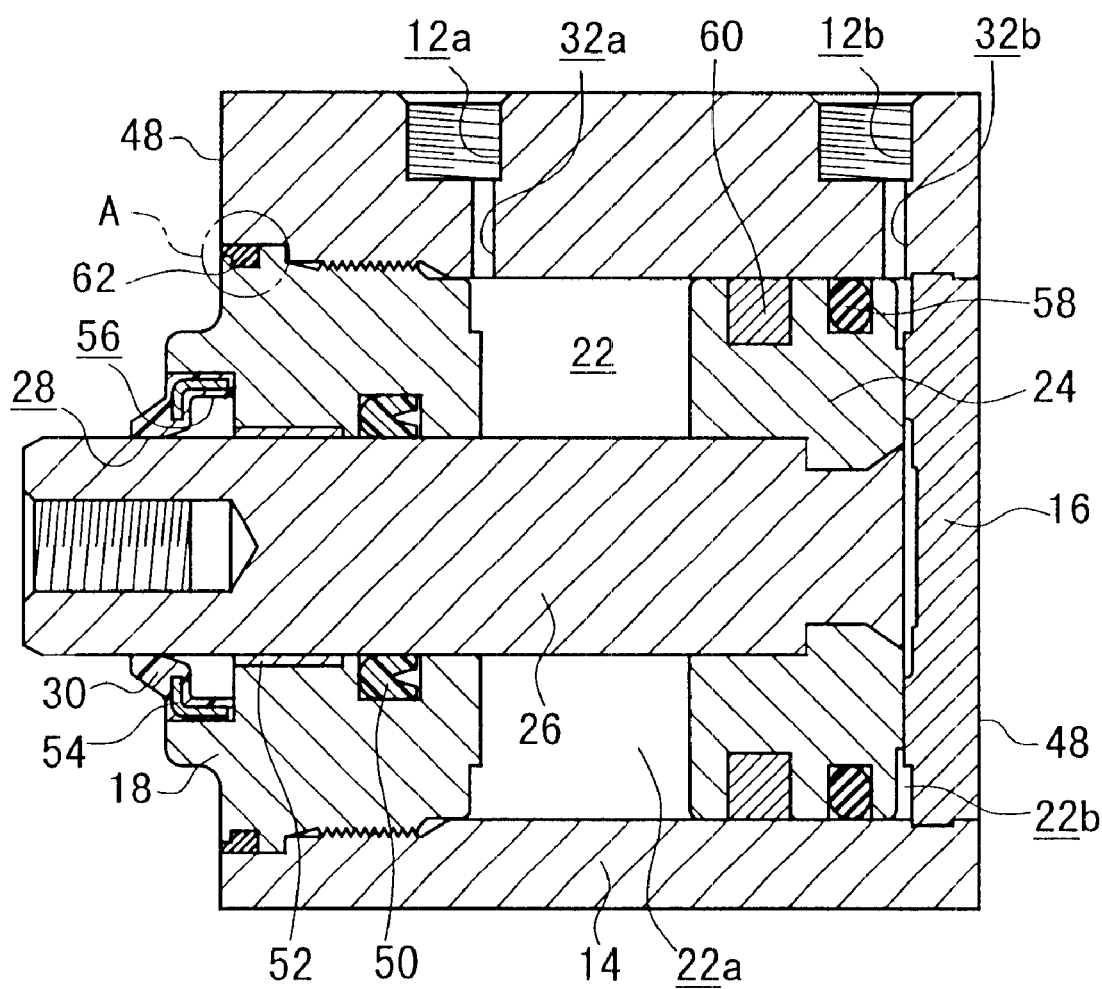
FIG. 3 is a longitudinal cross sectional view taken along line III—III of FIG. 2.

As shown in FIG. 3, the cylinder 10 further includes a piston 24 displaceable along a cylinder chamber 22 defined in the cylinder tube 14 by the head cover 16 and the rod cover 18, a piston rod 26 attached to the piston 24 at its one end and exposed to the outside at its other end, and a scraper 30 mounted in the annular recess of the rod cover 18. The scraper 30 has a bore 28 fore receiving the outer circumferential surface of the piston rod 26.

The pair of pressurized fluid inlet/outlet ports 12a and 12b communicate with the cylinder chamber 22 via passages 32a and 32b, respectively.

Figure 2:
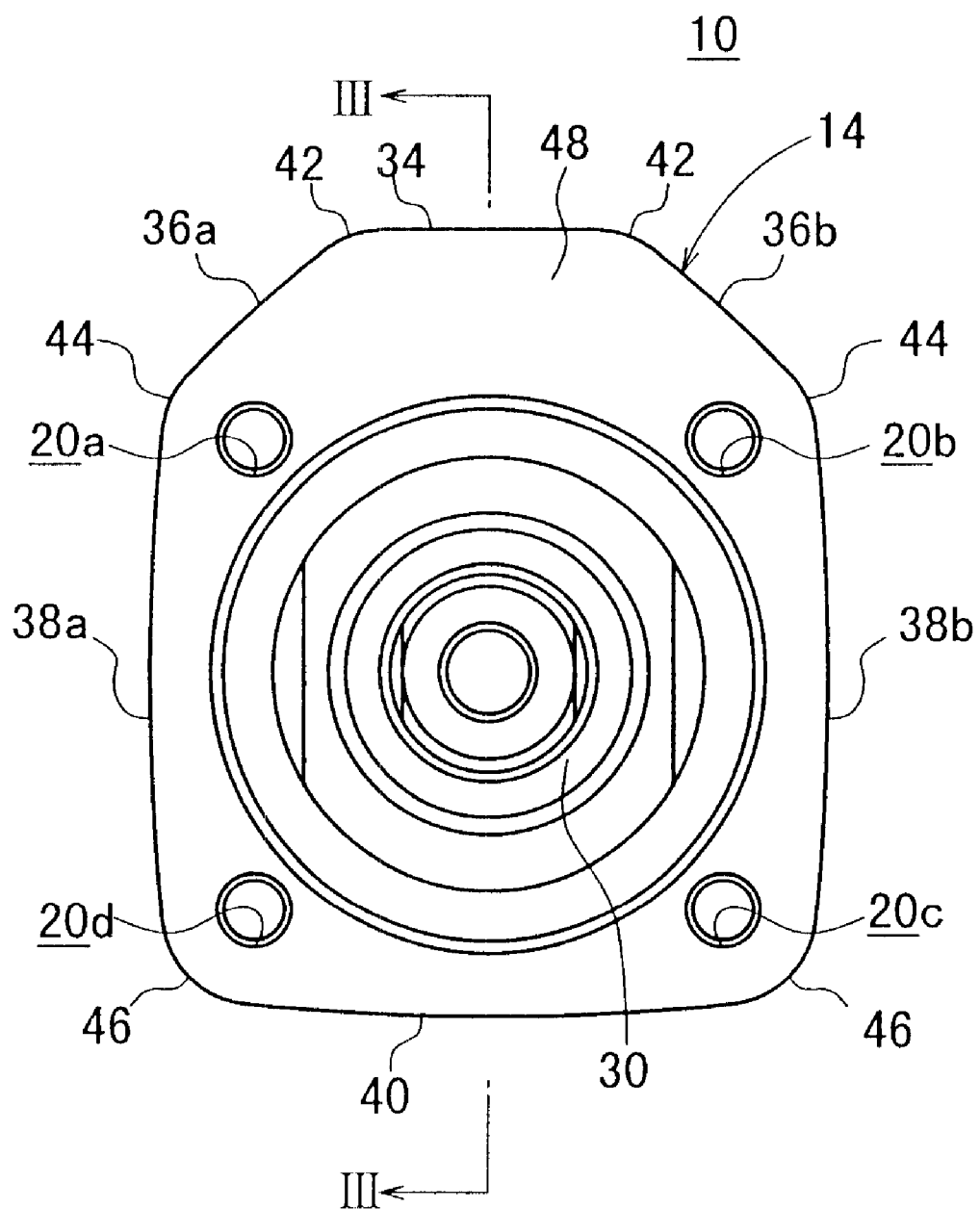
FIG. 2 is a front elevational view of the cylinder shown in FIG. 1.

As shown in FIG. 2, the outer circumferential surfaces of the cylinder tube 14 include an upper surface 34 having the pair of pressurized fluid inlet/outlet ports 12a and 12b, a pair of slope surfaces 36a and 36b sloping down at a predetermined angle from the upper surface 34, a pair of opposite side surfaces 38a and 38b extending from the slope surfaces 36a and 36b, and a bottom surface 40 extending from the pair of side surfaces 38a and 38b.

At the boundary portions between the upper surface 34 and the slope surfaces 36a and 36b, there are first chamfered portions 42 each having a predetermined radius of curvature. At the boundary portions between the slope surfaces 36a and 36b and the side surfaces 38a and 38b, there are second chambered portions 44 each having a predetermined radius of curvature. Further, at the boundary portions between the side surfaces 38a and 38b and the bottom surface 40, there are third chamfered portions 46 each having a predetermined radius of curvature.

Further, each of the upper surface 34, the pair of slope surfaces 36a and 36b, the pair of side surfaces 38a and 38b and the bottom surface 40, which compose the outer periphery of the cylinder tube 14, comprises an outwardly (convexly) curved surface having a predetermined radius of curvature.

Since all the outer circumferential surfaces of the cylinder tube 14 are formed of outwardly (convexly) curved surfaces and the first to third chamfered portions 42, 44 and 46, and the other side surfaces of the cylinder tube 14 are formed of upright surfaces (substantially vertical surfaces) 48, the cylinder tube 14 is contoured to allow the liquid on the outer surfaces of the cylinder tube 14 to naturally fall down in drops.

That is, in the outer periphery of the cylinder tube 14, there is no recess as might otherwise collect the liquid. Since no liquid can be trapped in the outer periphery of the cylinder tube 14, it is possible to avoid sanitary problems such as breeding of various germs.

As shown in FIG. 3, the head cover 16 is caulked in the hole of the cylinder tube 14 so that it may function as a metal seal to keep the cylinder chamber 22 gas-tight and to prevent the invasion of the liquid or the like from the outside.

On the inner circumferential surface of the rod cover 18, a rod packing 50 is fitted through an annular groove. The rod packing 50 seals the outer circumferential surface of the piston rod 26 to keep the cylinder chamber 22 gas-tight and liquid-tight. Further, a cylindrical bushing 52 is mounted in an annular recess formed in the inner circumferential surface of the rod cover 18, and a scraper 30 having a metallic member 54 embedded in a rubbery material is mounted in an annular recess formed in an end portion of the rod cover 18. An annular chamber 56 is formed between the scraper 30 and the rod cover 18. The annular chamber 56 functions as an oil sump to trap the lubricant on the outer circumferential surface of the piston rod 26.

In the outer circumferential surface of the piston 24, a piston packing 58 is fitted through an annular groove. The piston packing 58 is held in sliding contact with the inner wall surface of the cylinder chamber 22 to divide the cylinder chamber 22 into cylinder chambers 22a and 22b. Further, in the outer circumferential surface of the piston 24, a ring magnet 60 is mounted. The ring magnet 60 is disposed near the piston packing 58.

Figure 4:
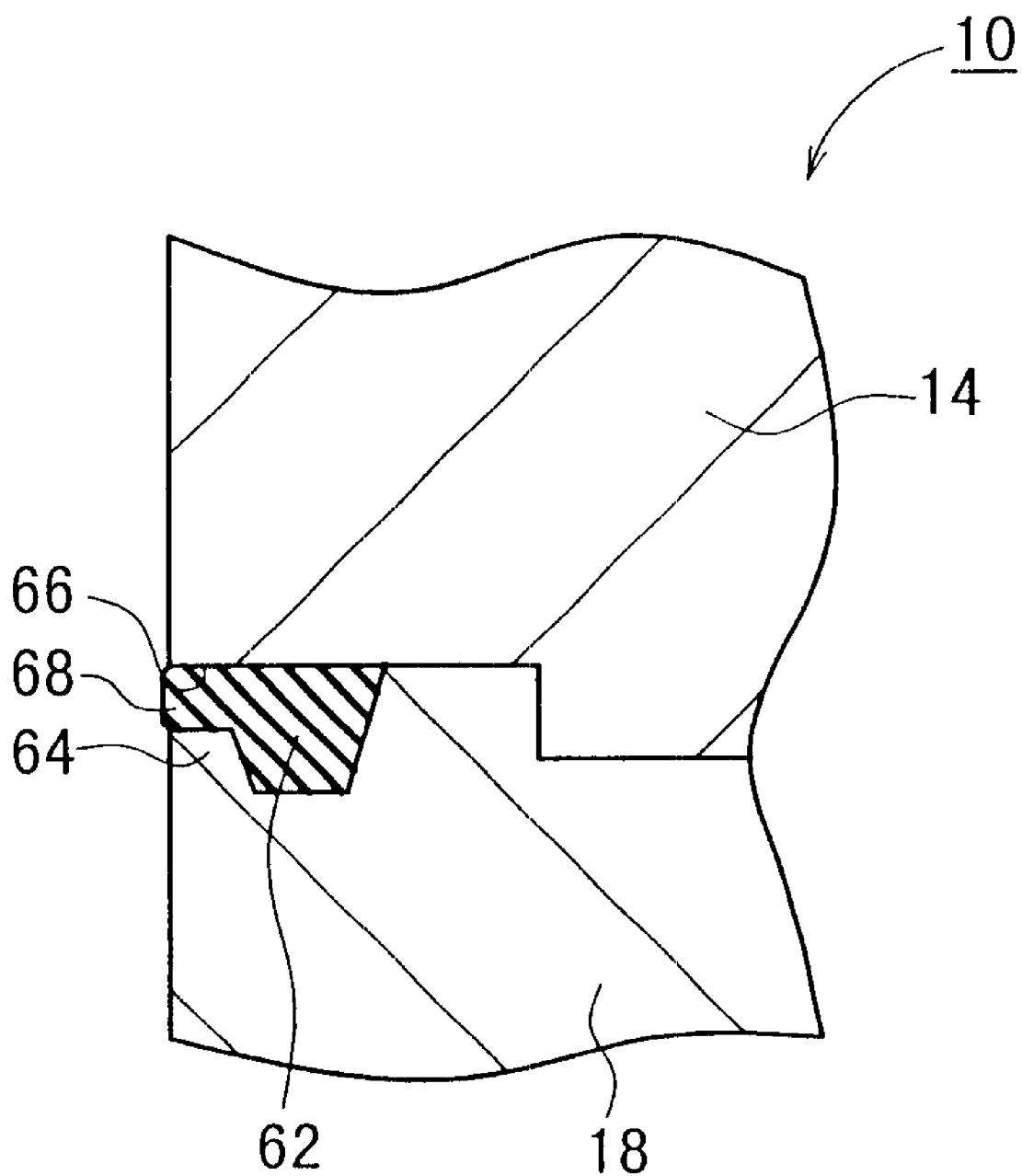
FIG. 4 is an enlarged longitudinal cross sectional view of a portion A shown in FIG. 3.

At an axial end of a joint between the cylinder tube 14 and the rod cover 18, an annular sealing member 62 is disposed. The annular sealing member 62 is formed of a flexible material such as rubber. As shown in FIG. 4, the sealing member 62 is mounted such that it is partially clamped in a narrow spacing between an annular ridge 64 formed on the rod cover 18 and the inner circumferential surface 66 of the cylinder tube 14.

Specifically, the annular sealing member 62 formed to have a substantially uniform thickness in the circumferential direction is provided in advance with a squeeze which is clamped between the annular ridge 64 formed on the outer circumferential surface of the rod cover 18 and the inner circumferential surface 66 of the cylinder tube 14. Therefore, it is possible to prevent the liquid or the like from entering the joint between the cylinder tube 14 and the rod cover 18 from the outside thanks to the reliable sealing function of a clamped portion 68 of the sealing member 62. Accordingly, the entry of the liquid into the cylinder tube 14 is prevented.

In the side surface of the cylinder tube 14, as shown in FIG. 1, a pair of threaded holes 70 for mounting a position detecting sensor 100 are formed.

Next, the position detecting sensor 100 according to a first embodiment of the invention is shown in FIGS. 6 to 11.

Figure 9:
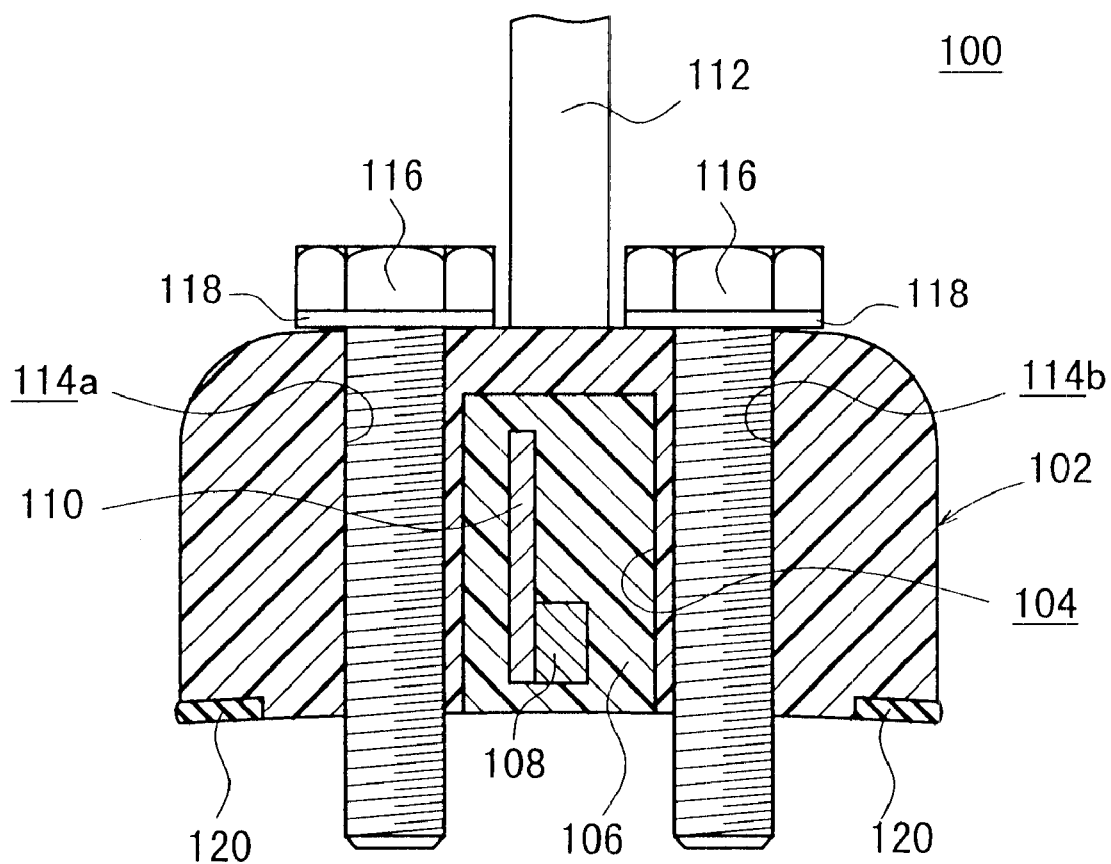
FIG. 9 is a longitudinal cross sectional view taken along line IX—IX of FIG. 8.
Figure 10:
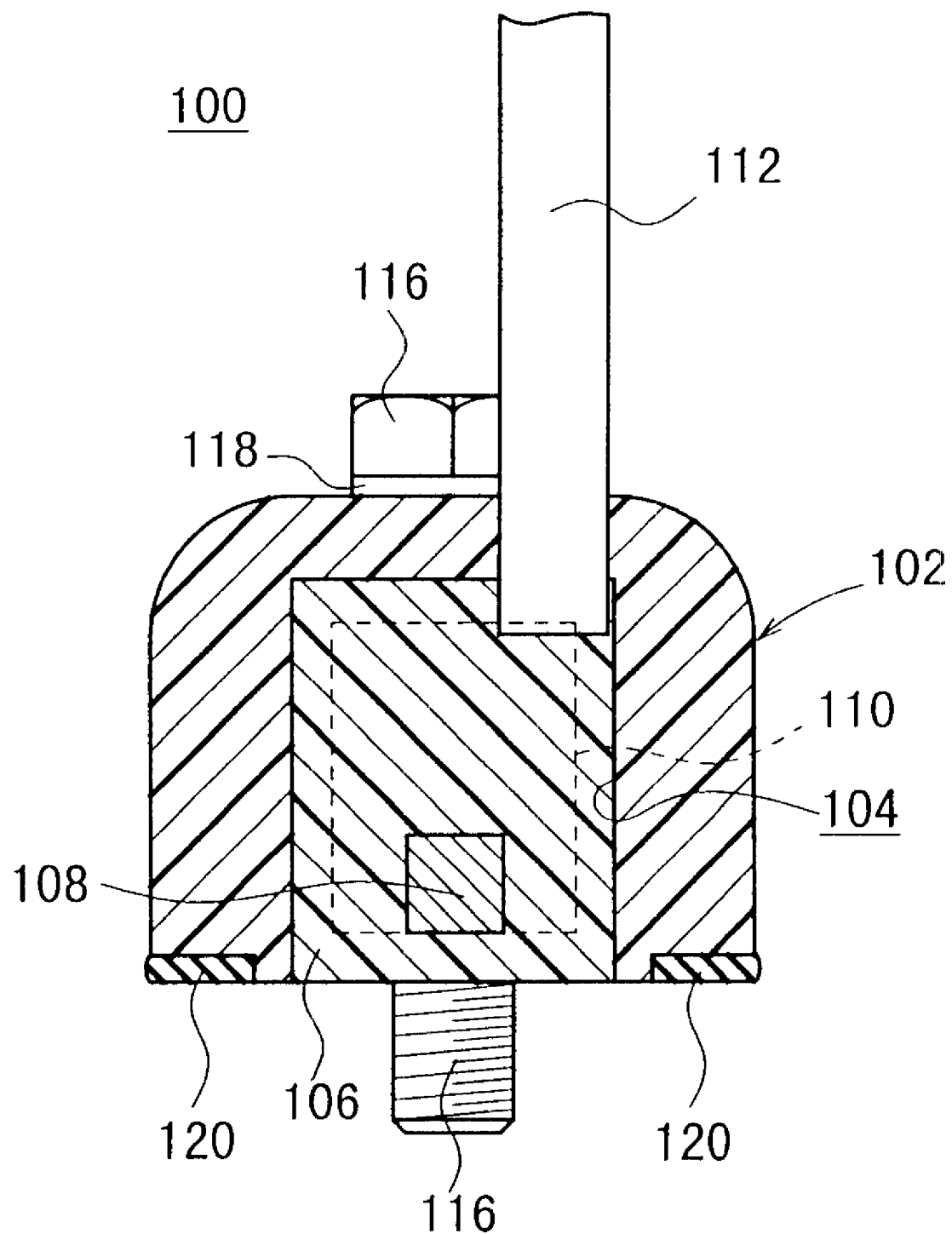
FIG. 10 is a longitudinal cross sectional view taken along line X—X of FIG. 8.

The position detecting sensor 100 includes a casing 102 made of a material such as an aluminum alloy, stainless steel or a synthetic resin and formed into a generally elliptical shape, and a resin member 106 made of a resin material such as an epoxy resin and fitted in a recess 104 of the casing 102 (see FIGS. 9 and 10). In the resin member 106, a substrate is buried. The substrate 110 is arranged with a detecting element 108. The substrate 110 is electrically connected to an end of a lead wire 112 which is exposed to the outside of the casing 102. Preferably, the detecting element 108 is a non-contact type element such as a Hall element or a magnetic-resistance element.

In the casing 102, as shown in FIG. 9, a pair of mounting holes 114a and 114b are formed. The mounting holes 114a and 114b extend at a predetermined spacing. In these mounting holes 114a and 114b, screw members 116 having hexagonal heads are inserted. Between the heads of the screw members 116 and the casing 102, packings 118 for blocking the invasion of the liquid or the like into the mounting holes 114a and 114b are interposed. On the bottom surface of the casing 102, a gasket 120 is mounted. The gasket 120 is made of a generally elliptical ring member extending along the peripheral edge of the casing 102. With this gasket 120, it is possible to prevent the entry of the liquid or the like into the clearance between the mounting surface of the cylinder 10 and the bottom surface of the casing 102.

This casing 102 comprises an outwardly (convexly) curved upper surface 122 having a predetermined radius of curvature (e.g., R of about 200 mm), an elliptical side surface 124 extending from the upper surface 122, and a chamfered portion 126 having a predetermined radius of curvature (e.g., R of 3.5 mm) formed at the boundary portion between the upper surface 122 and the side surface 124.

A bottom surface 128 of the casing 102 is curved to have a predetermined radius of curvature (e.g., R of about 200 mm) corresponding to the side surface 38b of the cylinder 10. The gasket 120 is attached to the bottom surface 128 of the casing 102. The bottom surface 128 of the casing 102 functions as a surface to be mounted on the side surface of the cylinder 10.

The cylinder 10 and the position detecting sensor 100 according to the embodiment of the invention are basically constructed as described hereinabove, and their actions and effects will be described below.

Figure 11:
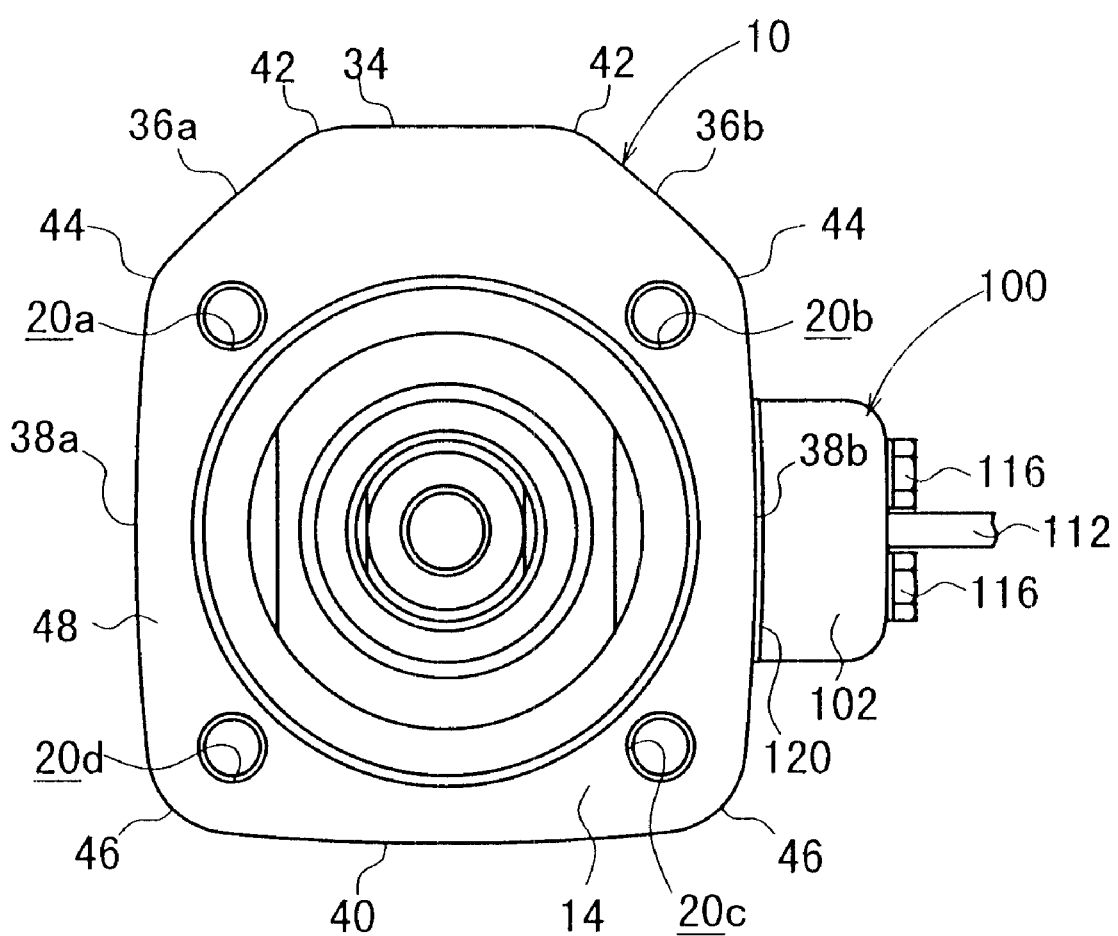
FIG. 11 is a side elevational view showing a state in which the position detecting sensor shown in FIG. 6 is mounted on the cylinder shown in FIG. 1.

First of all, the screw members 116 are inserted into the mounting holes 114a and 114b of the position detecting sensor 100, and an end of the screw members 116 are screwed into the threaded holes 70 of the cylinder 10, so that the position detecting sensor 100 is mounted on the side surface 38b of the cylinder 10 (see FIG. 11).

Subsequently, a pressurized fluid (e.g., air) is supplied from an unillustrated pressurized fluid source into the pressurized fluid inlet/outlet port 12a. The pressurized fluid thus supplied into the pressurized fluid inlet/outlet port 12a is introduced via the passage 32a into the cylinder chamber 22a to push the piston 24 toward the cylinder chamber 22b.

When the piston 24 arrives at the final displacement end position under the action of the pressurized fluid, the magnetic field of the magnet 60 mounted on the piston 24 is detected by the detecting element 108 of the position detecting sensor 100, so that the position detecting sensor 100 outputs a detection signal to an external device such as an unillustrated controller through the lead wire 112 connected to the substrate 110.

When the supply of the pressurized fluid is switched by the switching action of an unillustrated directional control valve from the pressurized fluid inlet/outlet port 12a to the pressurized fluid inlet/outlet port 12b, the piston 24 is displaced back to its initial position. In this manner, the piston 24 in the cylinder tube 14 can be reciprocated along the cylinder chamber 22.

The cylinder 10 and the position detecting sensor 100 attached to the cylinder 10 according to the embodiment are assembled with an unillustrated food processing machine or the like for performing washing operations. As described above, the entire outer periphery of the cylinder tube 14 is formed of the outwardly (convexly) curved surfaces and the first to third chamfered portions 42, 44 and 46. Further, the casing 102 of the position detecting sensor 100 is formed of the curved upper surface 122 having the predetermined radius of curvature, the elliptical side surface 124 extending from the upper surface 122, and the chamfered portion 126 having the predetermined radius of curvature formed at the boundary portion between the upper surface 122 and the side surface 124. As a result, the liquid on the outer peripheries of the cylinder tube 14 and the position detecting sensor 100 easily falls down in drops. Accordingly, it is possible to prevent the liquid from being trapped in the outer peripheries of the cylinder tube 14 and the position detecting sensor 100.

As described above, the cylinder 10 and the position detecting sensor 100 according to the embodiment are contoured such that the liquid is hardly trapped in their outer surfaces but naturally falls in drops. Accordingly, it is possible to avoid sanitary problems such as breeding of various germs.

Further, as shown in FIG. 4, the annular sealing member 62 is advantageously utilized. The annular sealing member 62 has the squeeze clamped between the annular ridge 64 formed on the outer circumferential surface of the rod cover 18 and the inner circumferential surface 66 of the cylinder tube 14. In contrast, in a cylinder 78 according to a comparison example shown in FIG. 5, an O-ring 76 having a circular cross section is fitted in a joint portion between a cylinder tube 72 and a rod cover 74. In this cylinder 78, the liquid or the like invades through the joint portion between the cylinder tube 72 and the rod cover 74 up to the portion where the O-ring is fitted. As a result, unwanted germs are bred by the liquid or the like.

Figure 5:
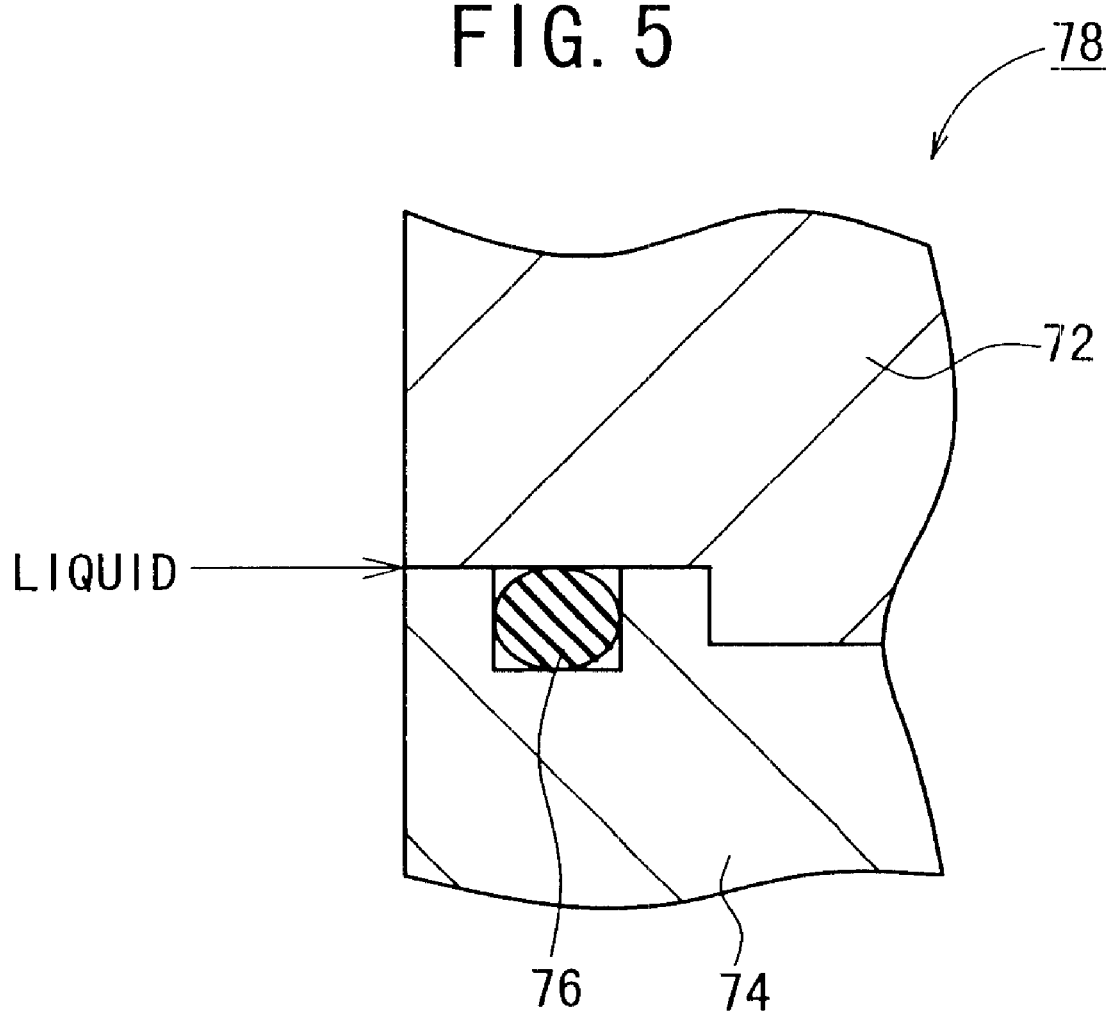
FIG. 5 is an enlarged longitudinal cross sectional view of a portion of a cylinder according to a comparison example.

In other words, the O-ring 76 fitted in the cylinder 78 according to the comparison example of FIG. 5 has only the function to block the air in the cylinder chamber from leaking to the outside, and the liquid having flown through the joint portion between the cylinder tube 72 and the rod cover 74 is allowed to invade into the portion where the O-ring 76 is fitted thereby to facilitate the breeding of the various germs.

In contrast, in the cylinder 10 according to the embodiment, the sealing is reliably effected by the clamped portion 68 of the sealing member 62. Therefore, the invasion of the liquid or the like, as might otherwise occur from the outside into the cylinder tube 14 through the joint portion between the cylinder tube 14 and the rod cover 18, can be reliably blocked. As a result, the various germs can be prevented from being bred by the liquid or the like, thereby making it possible to avoid the sanitary problems.

In the position detecting sensor 100 according to the first embodiment, as shown in FIGS. 9 and 10, the resin member 106 is formed by embedding the substrate 110 having the detecting element 108 in the resin material or the like. The resin member 106 is formed integrally with the casing 102 in the recess 104. By inserting the screw members 116 into the mounting holes 114a and 114b formed in the casing 102, the detecting element 108, the substrate 110, the casing 102 and so on can be integrally fitted to the cylinder 10.

In the position detecting sensor 100 according to the first embodiment, no clearance for allowing the invasion of the liquid or the like is formed in the casing 102 so that no respiratory action occurs due to the change of temperature. Therefore, it is possible to prevent the breeding of fungi or bacteria, as might otherwise be caused by the moisture or the like in the casing 102.

Further, in the position detecting sensor 100 according to the first embodiment, no mechanism is provided for adjusting a detecting position. As a s result, the position detecting sensor 100 is advantageous in that its size and weight can be reduced and in that the surface area of the casing 102 can be decreased to suppress the total amount of the liquid which resides on the casing 102.

When the position detecting sensor 100 according to the first embodiment is not employed, the threaded holes 70 formed in the side surface 38b of the cylinder 10 may be closed with closure means such as unillustrated bolts having seal washers.

Figure 6:
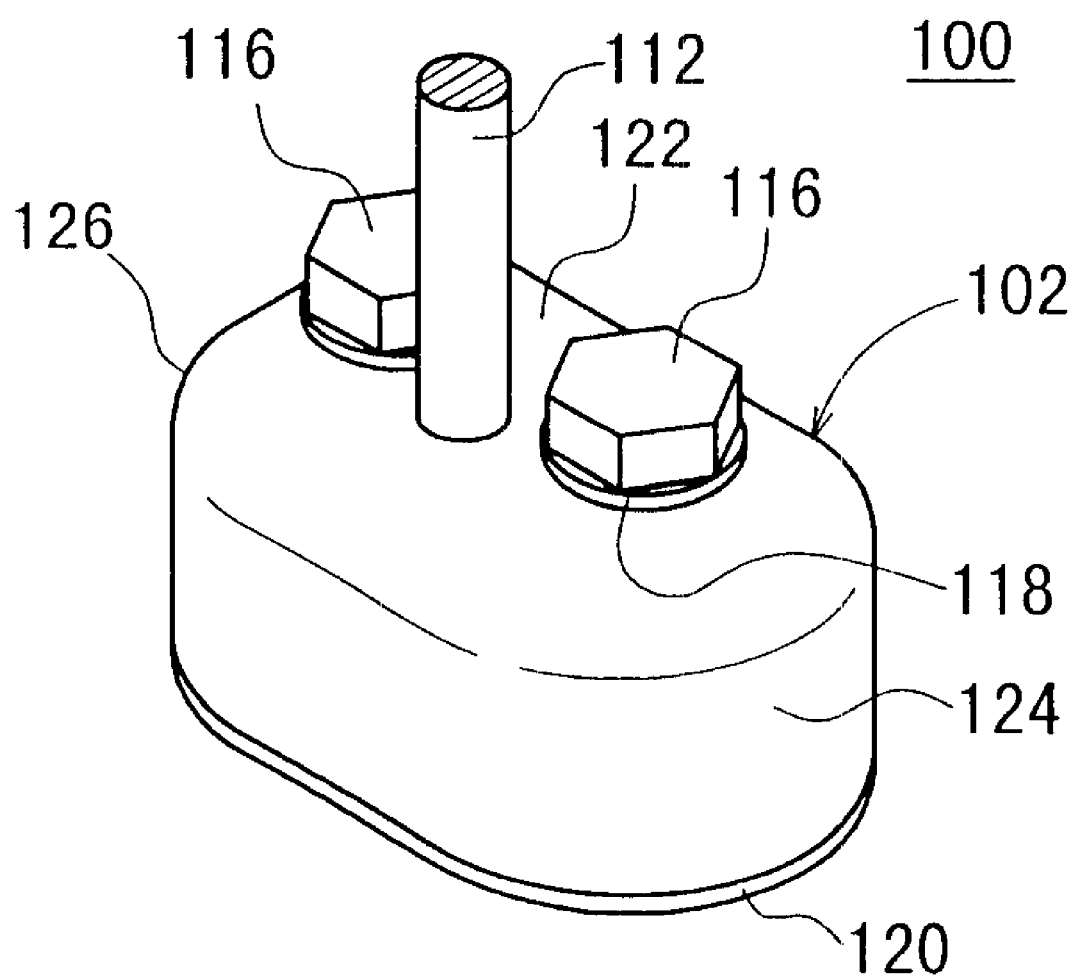
FIG. 6 is a perspective view of a position detecting sensor according to a first embodiment of the invention.
Figure 7:
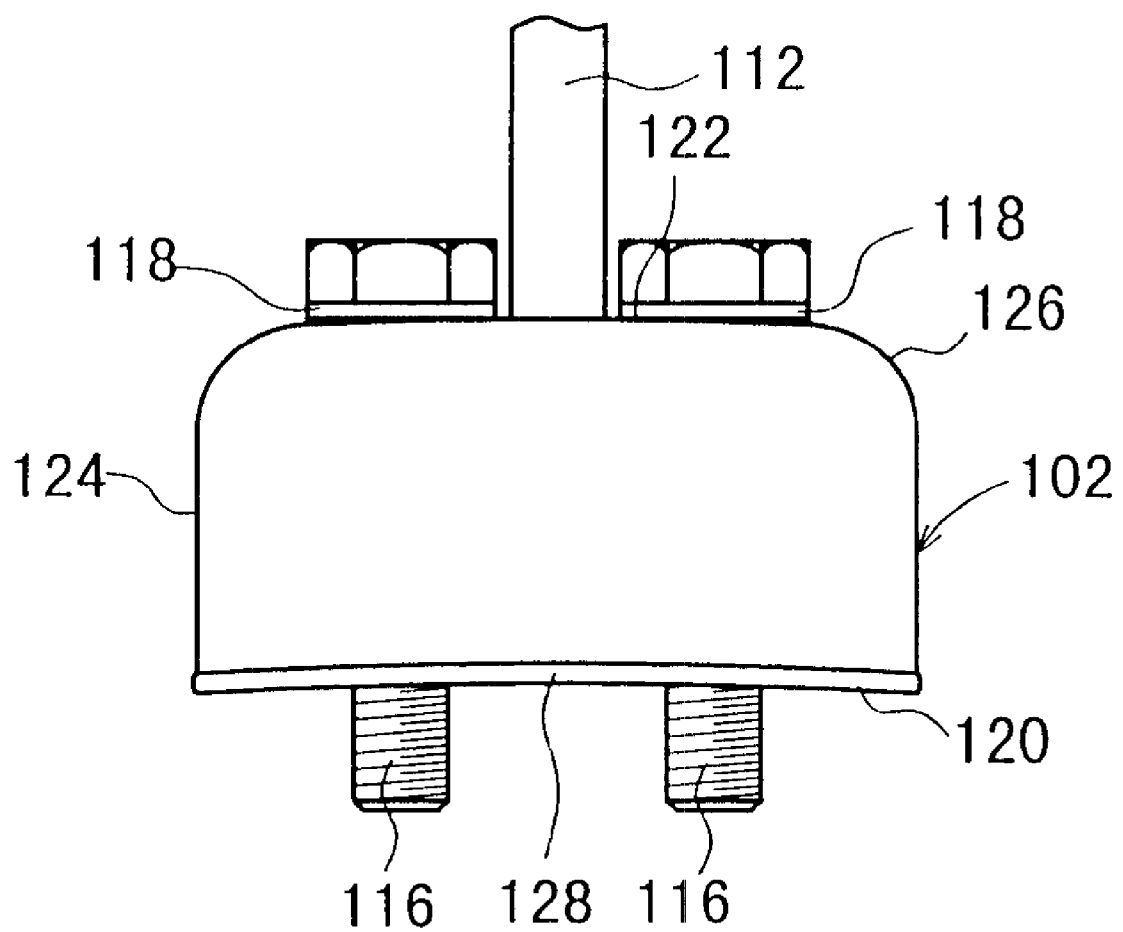
FIG. 7 is a front elevational view of the position detecting sensor shown in FIG. 6.
Figure 8:
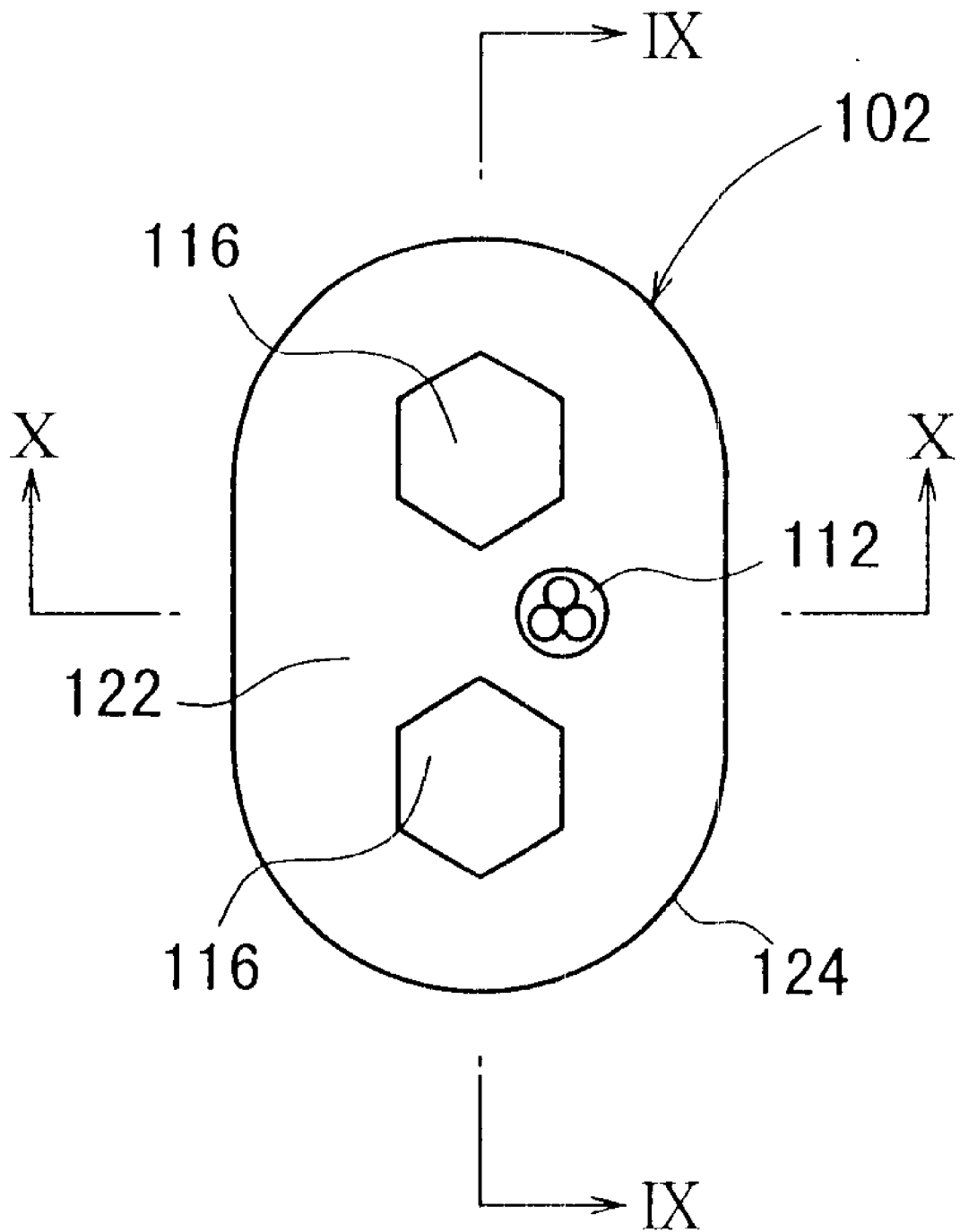
FIG. 8 is a top plan view of the position detecting sensor shown in FIG. 6.

Next, a position detecting sensor 200 according to a second embodiment is shown in FIGS. 12 to 17. The same components as those of the position detecting sensor 100 shown in FIG. 6 are designated by the common reference numerals, and the detailed description thereof will be omitted.

Figure 12:
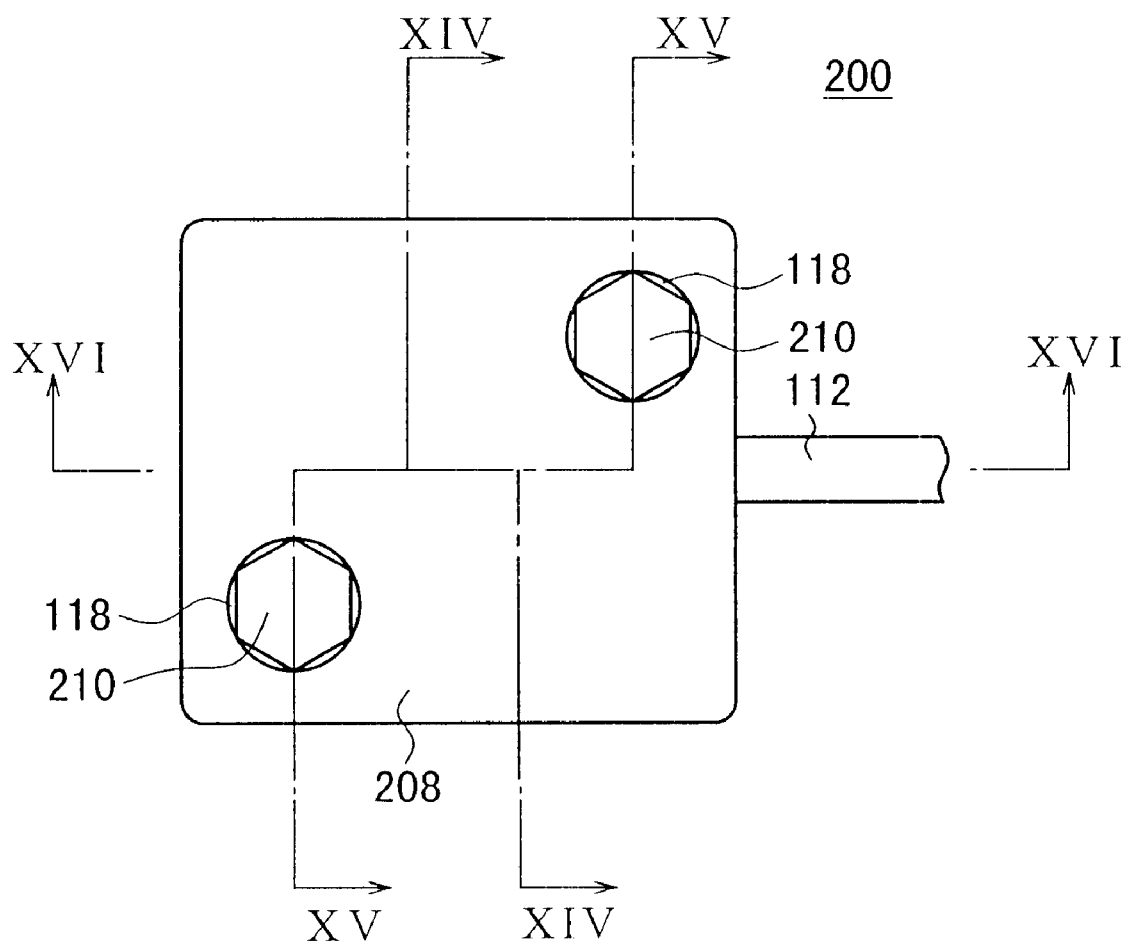
FIG. 12 is a top plan view of a position detecting sensor according to a second embodiment of the invention.
Figure 13:
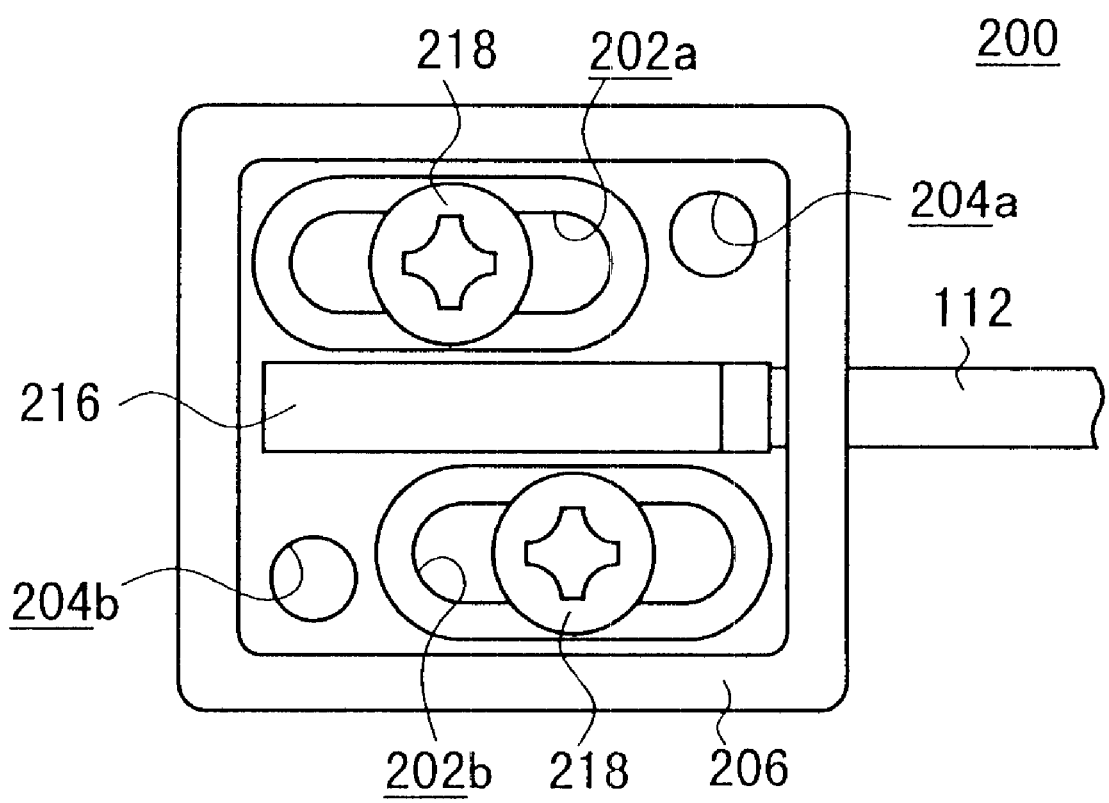
FIG. 13 is a top plan view showing the position detecting sensor shown in FIG. 12 showing a state in which its cover is removed.

As shown in FIGS. 12 and 13, the position detecting sensor 200 according to the second embodiment comprises a casing 206 of a rectangular cross section having a pair of generally parallel slots 202a and 202b and a pair of mounting holes 204a and 204b, a cover member 208 to be fitted over the casing 206, and hexagonal bolts 210 for fixing the cover member 208 on the casing 206. Between the cover member 208 and the casing 206, a gasket 212 for blocking the invasion of the liquid or the like into the inside is interposed.

A substrate 216 is positioned in a closed chamber 214 defined by the casing 206 and the cover member 208. An unillustrated detecting element is mounted on the substrate 216. The aforementioned lead wire 112 is electrically connected with the substrate 216.

The position detecting sensor 200 can be mounted on the cylinder 10 (see FIG. 17) by inserting mounting screws 218 individually into the slots 202a and 202b of the casing 206 and by fastening the mounting screws 218 into the threaded holes 70 formed in one side of the cylinder 10. The function to lock the position detecting sensor 200 can be achieved by using the pair of mounting screws 218.

Figure 14:
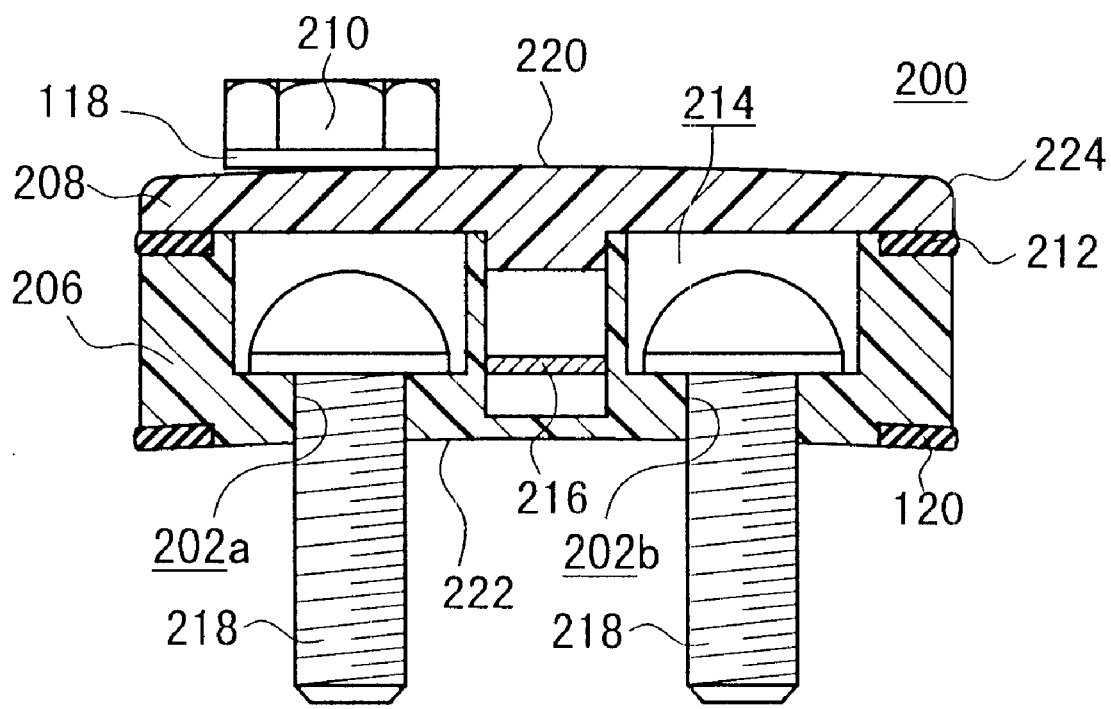
FIG. 14 is a longitudinal cross sectional view taken along line XIV—XIV of FIG. 12.
Figure 15:
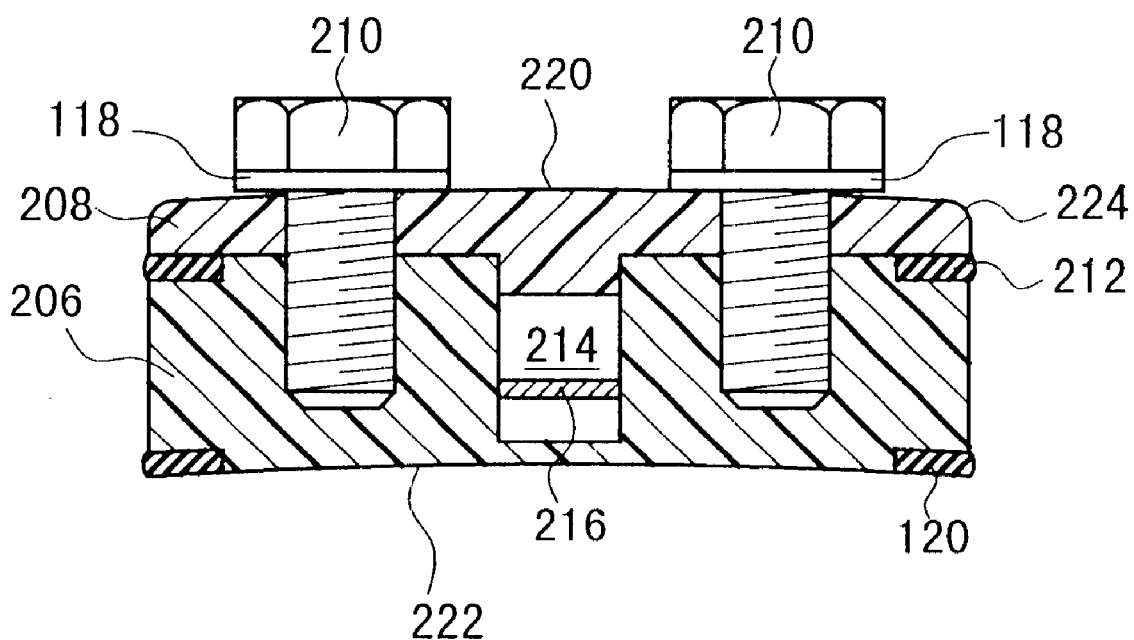
FIG. 15 is a longitudinal cross sectional view taken along line XV—XV of FIG. 12.
Figure 16:
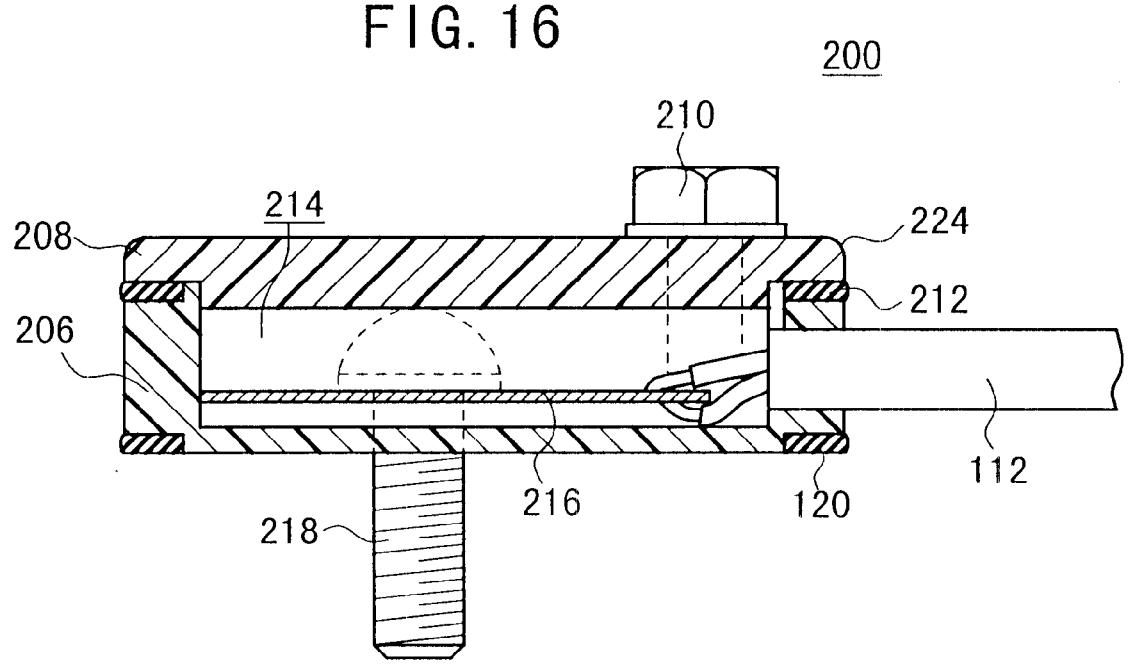
FIG. 16 is a longitudinal cross sectional view taken along line XVI—XVI of FIG. 12.
Figure 17:
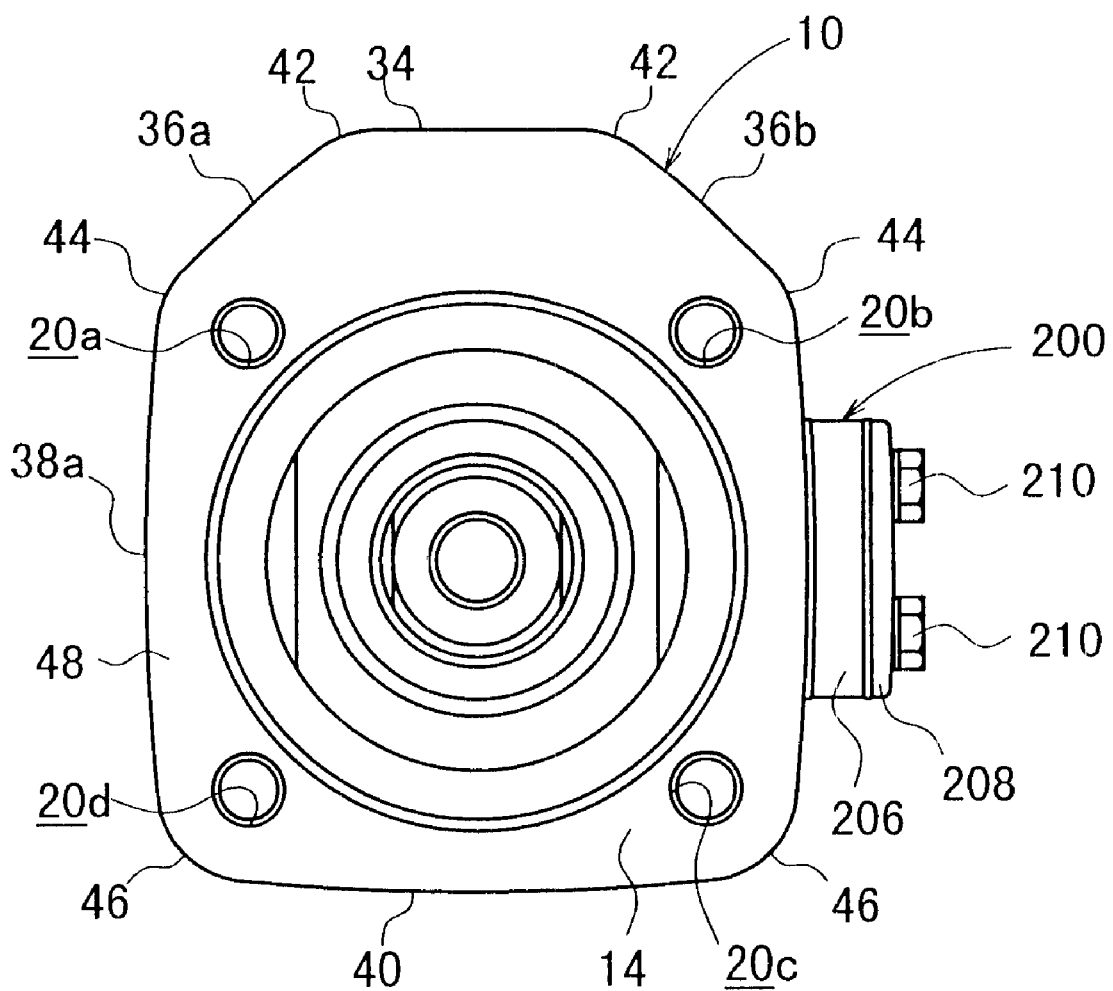
FIG. 17 is a side elevational view showing a state in which the position detecting sensor shown in FIG. 12 is mounted on the cylinder shown in FIG. 1.

The upper surface 220 of the cover member 208 and the bottom surface 222 of the casing 206 are convexly curve to have a predetermined radius of curvature (e.g., R of about 200 mm), as shown in FIGS. 14 and 15. The peripheral portions 224 formed in a generally rectangular shape to extend from the upper surface of the cover member 208 are chamfered. Likewise, the four corner portions of the cover member 208 and the four corner portions of the casing 206 are chamfered.

In the position detecting sensor 200 according to the second embodiment, as shown in FIG. 13, the position of the position detecting sensor 200 can be adjusted by removing the cover member 208 and displacing the casing 206 in the axial direction along the slots 202a and 202b engaging with the mounting screws 218.

In the position detecting sensor 200 according to the second embodiment, the position detecting sensor 200 can be easily mounted by forming the pair of threaded holes in the mounting surface or the side surface of the cylinder and by fastening the pair of mounting screws 218 in the pair of threaded holes. As a result, there is an advantage that the mounting surface on the cylinder side can be formed in a simple shape while retaining the position adjusting function.

The other effects of position detecting sensors according to the following embodiments are similar to those of the aforementioned position detecting sensor 100, and their detailed description will be omitted.

Next, a position detecting sensor 300 according to a third embodiment is shown in FIGS. 18 to 21. Here, the same components as those of the position detecting sensor 200 according to the second embodiment, as shown in FIG. 12, are designated by the common reference numerals, and their detailed description will be omitted.

The position detecting sensor 300 according to the third embodiment comprises a casing 304 of a rectangular section having a rail 302 arranged to extend at the central portion in an axial direction, and a cover member 306 to be fitted over the casing 304. In the rail 302, an axial recess 308 is formed in the axial direction, in which a cylindrical sensor portion 310 is retained in a predetermined position through a screw member 312. The sensor portion 310 is provided with an unillustrated detecting element which is molded of a resin material or the like.

In the position detecting sensor 200 according to the second embodiment, the casing 206 is made movable along the slots. However, the position detecting sensor 300 according to the third embodiment is characterized in that the casing 304 is fixed on the cylinder 10 by the mounting screws 218 and in that the position to be detected can be adjusted by displacing the sensor portion 310 along the recess of the rail 302.

In this case, the sensor portion 310 is shared to provide advantages that a compatibility is established to correspond to various cylinders 10 of different shapes and standards, and that the sensor portion can be easily replaced by a new one for maintenance.

The upper surface 220 of the cover member 306 and the bottom surface 222 of the casing 304 are convexly curved outward to have a predetermined radius of curvature (e.g., R of about 200 mm), in a similar manner to the second embodiment. The peripheral portions, as formed in a generally rectangular shape to extend from the upper surface of the cover member 306, are chamfered at a portion 224, and the cover member 306 and the casing 304 are likewise chamfered at the four corner portions.

Figure 18:
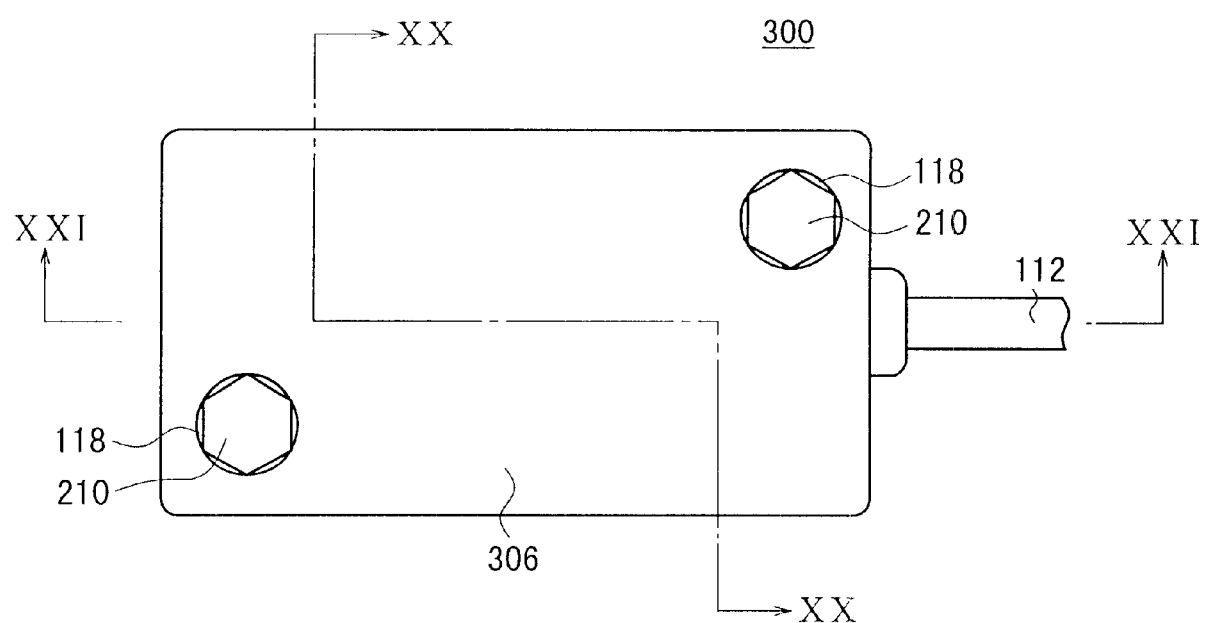
FIG. 18 is a top plan view of a position detecting sensor according to a third embodiment of the invention.
Figure 19:
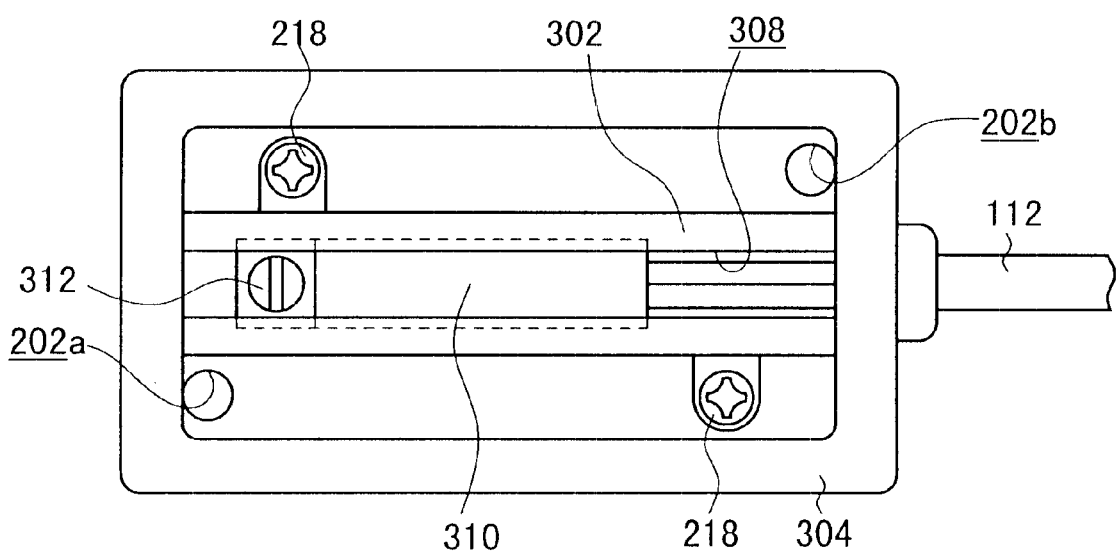
FIG. 19 is a top plan view showing the position detecting sensor shown in FIG. 18 showing a state in which its cover is removed.
Figure 20:
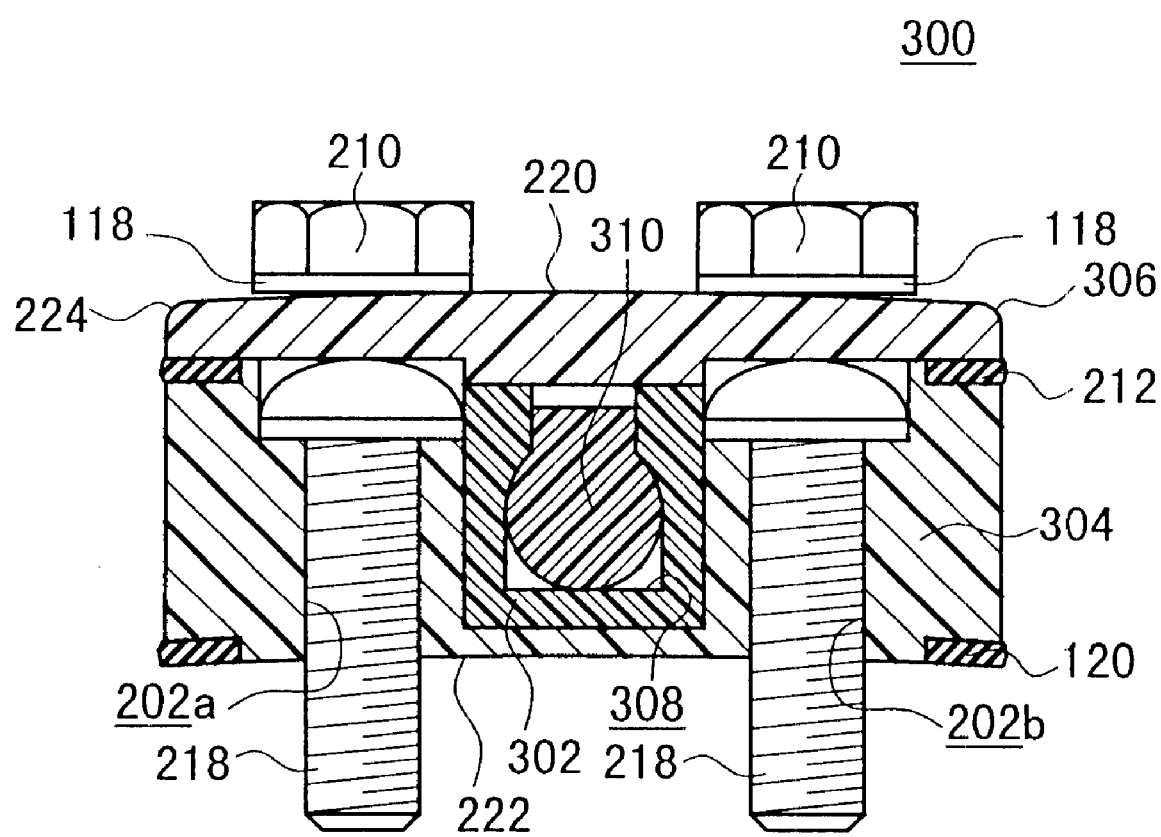
FIG. 20 is a longitudinal cross sectional view taken along line XX—XX of FIG. 18.
Figure 21:
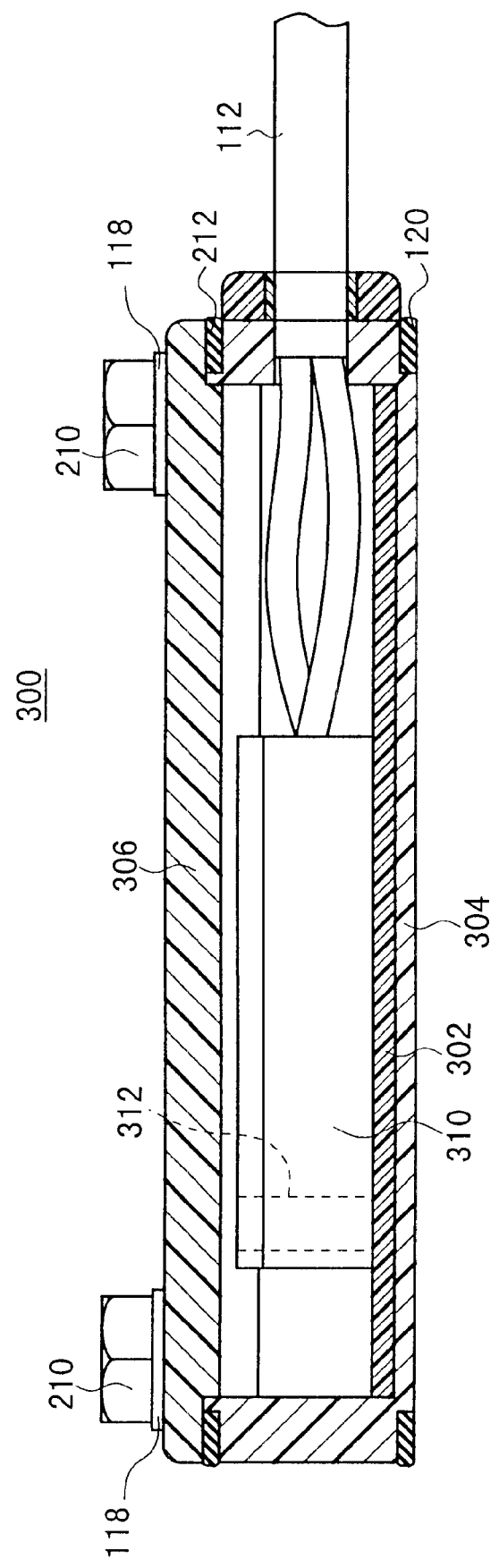
FIG. 21 is a longitudinal cross sectional view taken along line XXI—XXI of FIG. 18.
Figure 22:
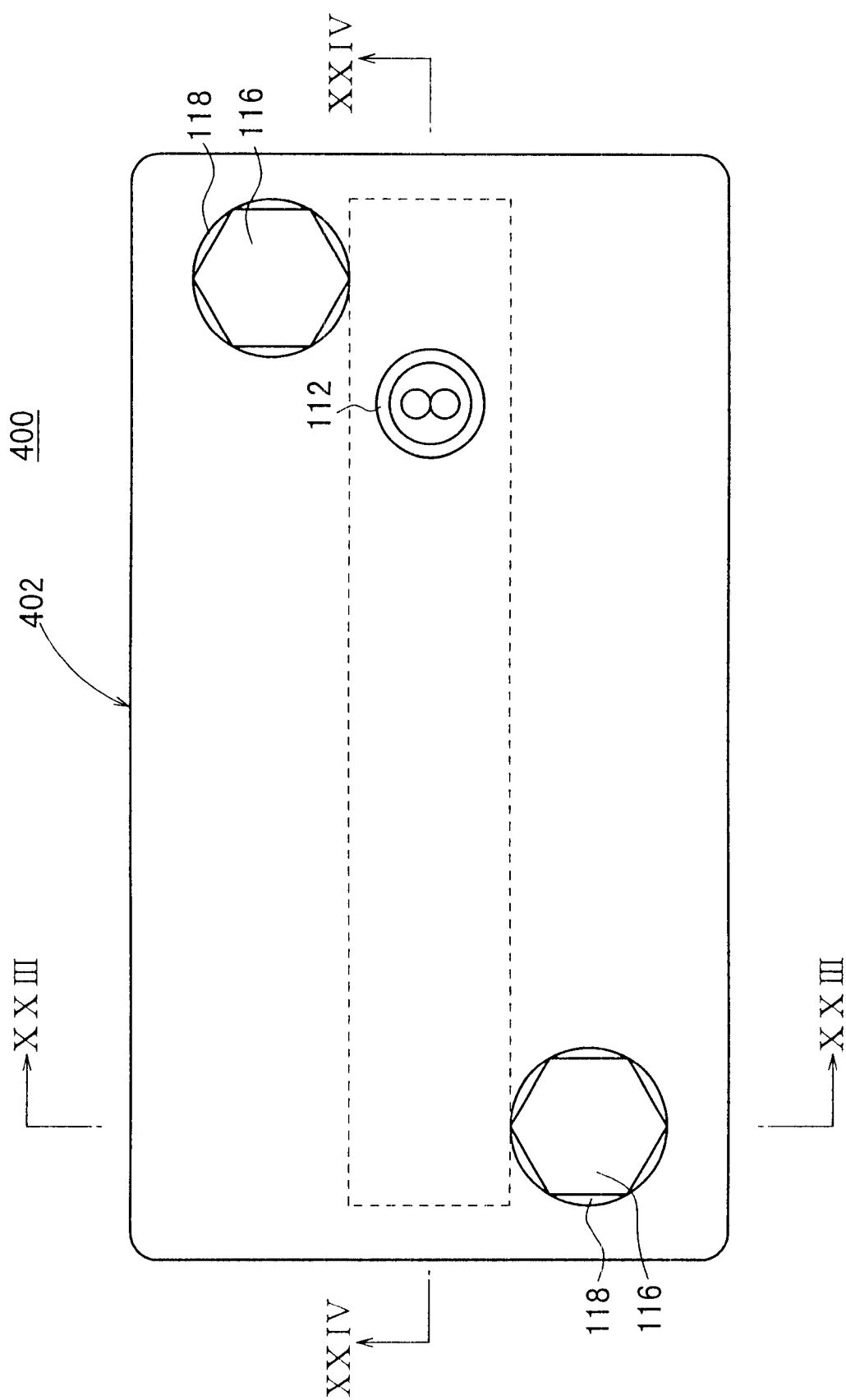
FIG. 22 is a top plan view of a position detecting sensor according to a fourth embodiment of the invention.
Figure 23:
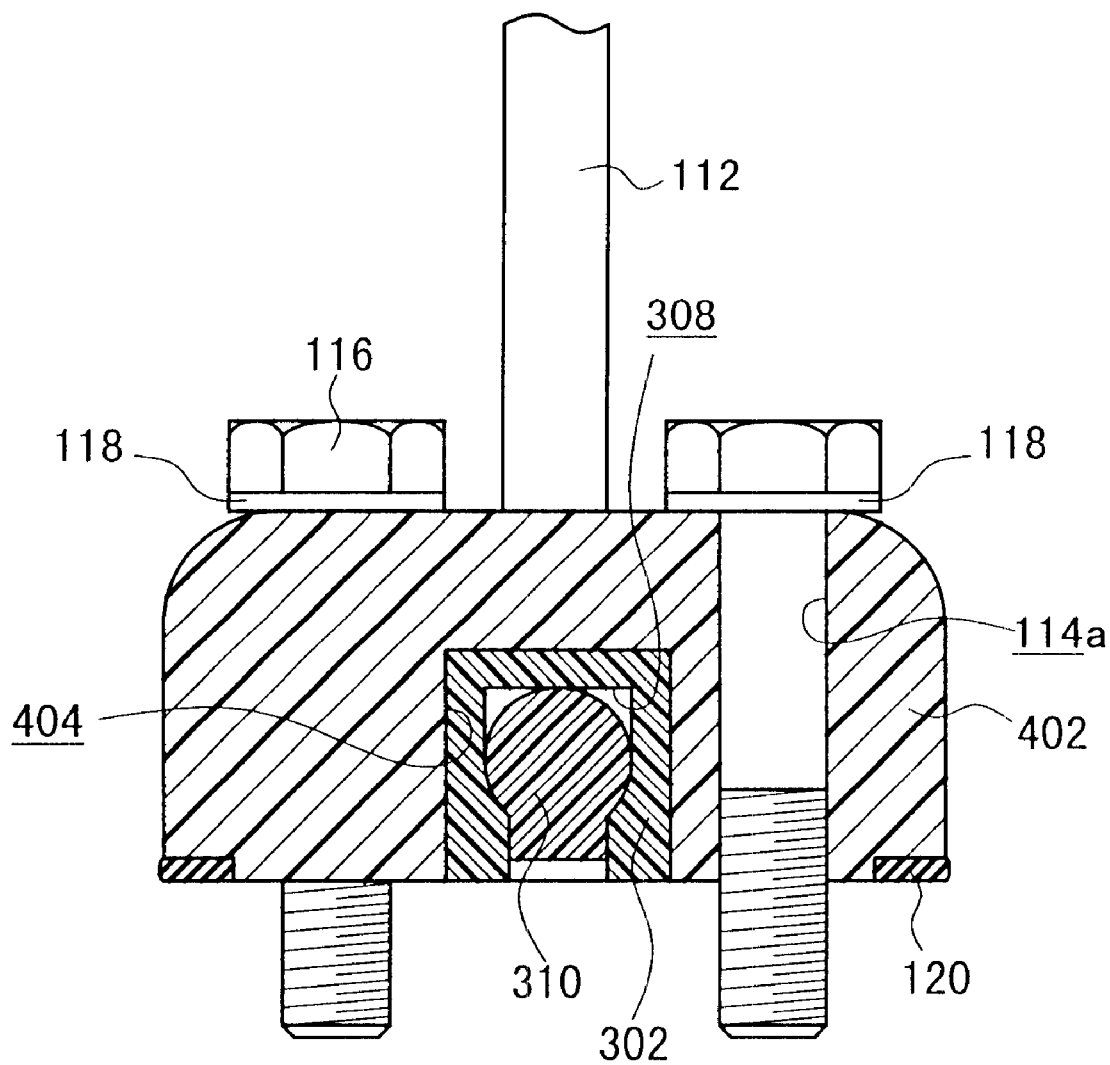
FIG. 23 is a longitudinal cross sectional view taken along line XXIII—XXIII of FIG. 22.
Figure 24:
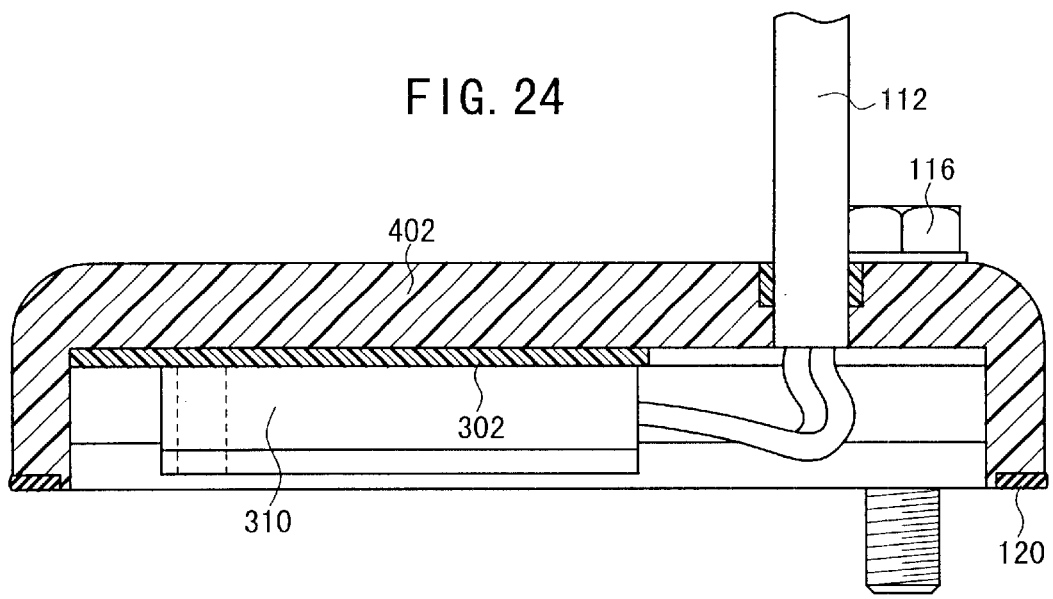
FIG. 24 is a longitudinal cross sectional view taken along line XXIV—XXIV of FIG. 22.
Figure 25:
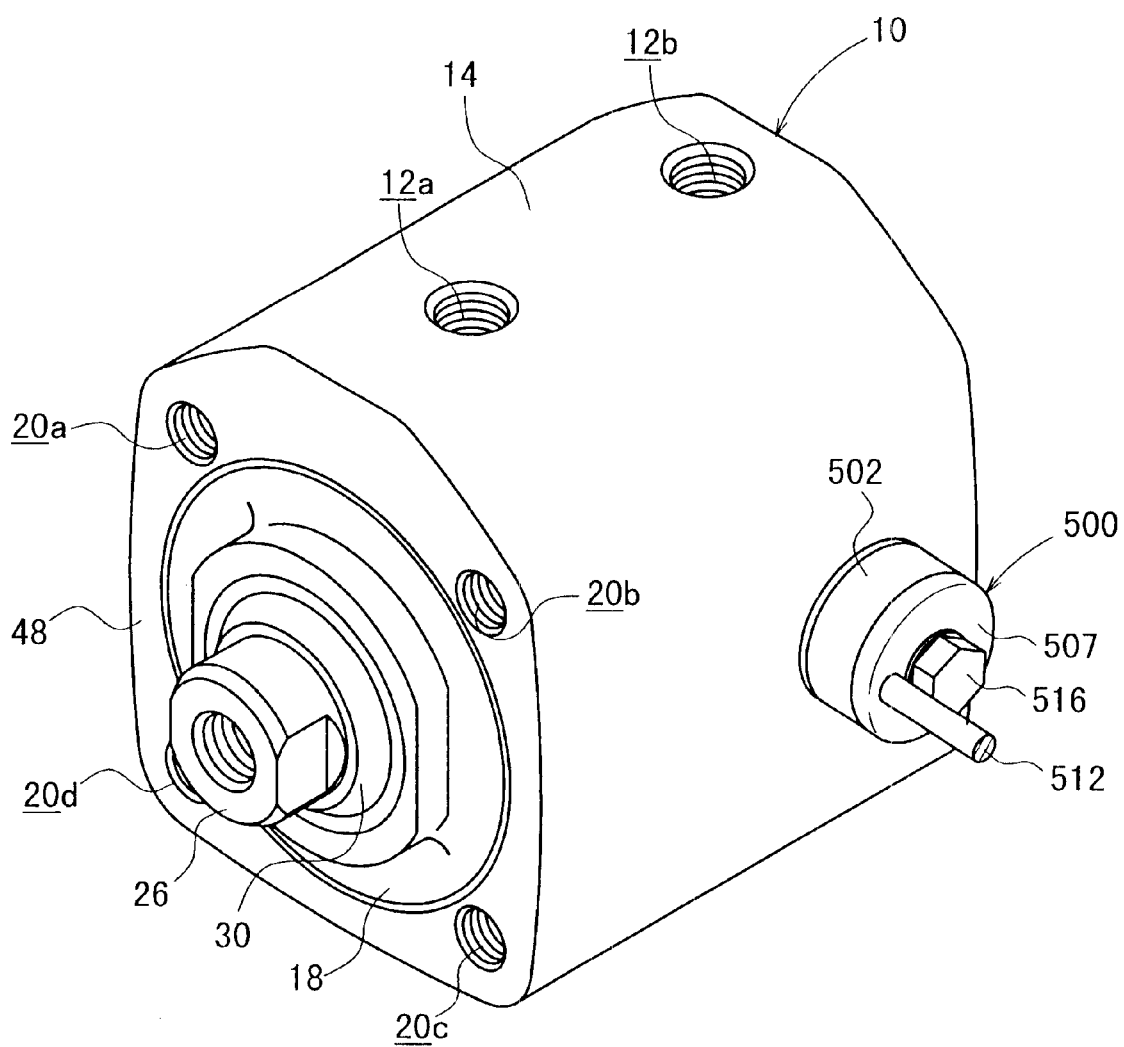
FIG. 25 is a perspective view of the cylinder on which a position detecting sensor according to a fifth embodiment of the invention is mounted.
Figure 26:
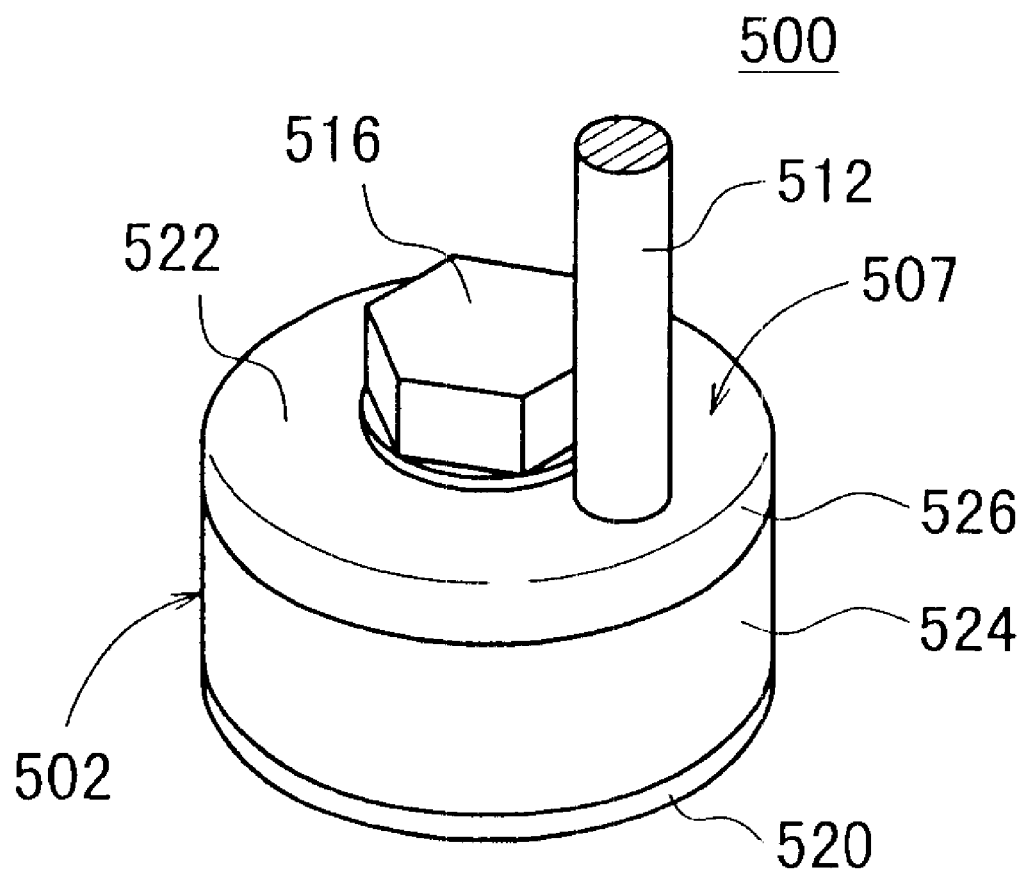
FIG. 26 is a perspective view of the position detecting sensor shown in FIG. 25.
Figure 27:
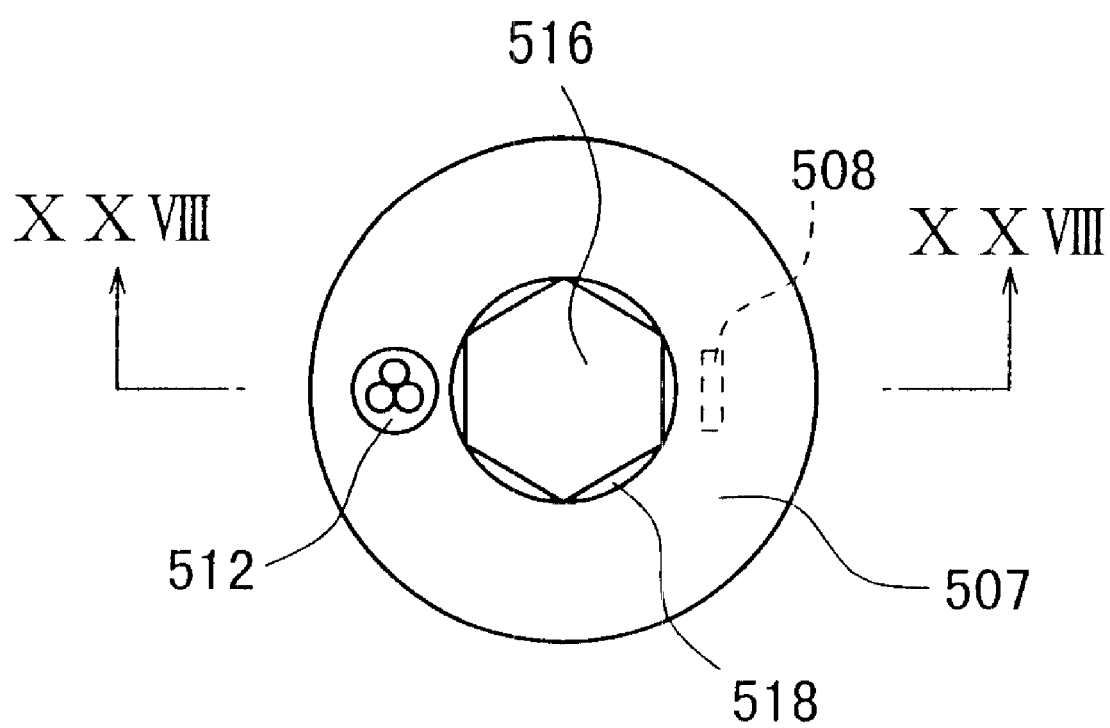
FIG. 27 is a top plan view of the position detecting sensor shown in FIG. 26.

Next, a position detecting sensor 400 according to a fourth embodiment is shown in FIGS. 22 to 24. The same components as those of the position detecting sensors 100 and 300 according to the first and third embodiments, as shown in FIGS. 6 and 18, are designated by the common reference numerals, and detailed descriptions of those components will be omitted.

The position detecting sensor 400 according to the fourth embodiment is characterized, as shown in FIGS. 23 and 24, in that a groove portion 404 which extends in the axial direction is formed in the bottom surface of an integral casing 402, and in that the rail 302 and the sensor portion 310 are fitted in the groove portion 404.

Specifically, in the position detecting sensor 300 according to the third embodiment, the casing is divided into the casing 304 and the cover member 306, and the hexagonal bolts 210 are provided for fitting the cover member 306 on the casing 304 and the mounting screws 218 for mounting the position detecting sensor 300 itself in the threaded holes of the cylinder 10. However, the position detecting sensor 400 according to the fourth embodiment is different in that the integral casing 402 is formed to have a generally elliptical section similar to that of the position detecting sensor 100 according to the first embodiment, and in that the rail 302 and the sensor portion 310, as used in the position detecting sensor 300 according to the third embodiment, are integrally provided in the groove portion 404 which is formed in the bottom surface of the casing 402.

In this case, the sensor portion 310 can be displaced along the recess 308 of the rail 302.

Next, a position detecting sensor 500 according to a fifth embodiment of the invention is shown in FIGS. 25 to 31.

Figure 29:
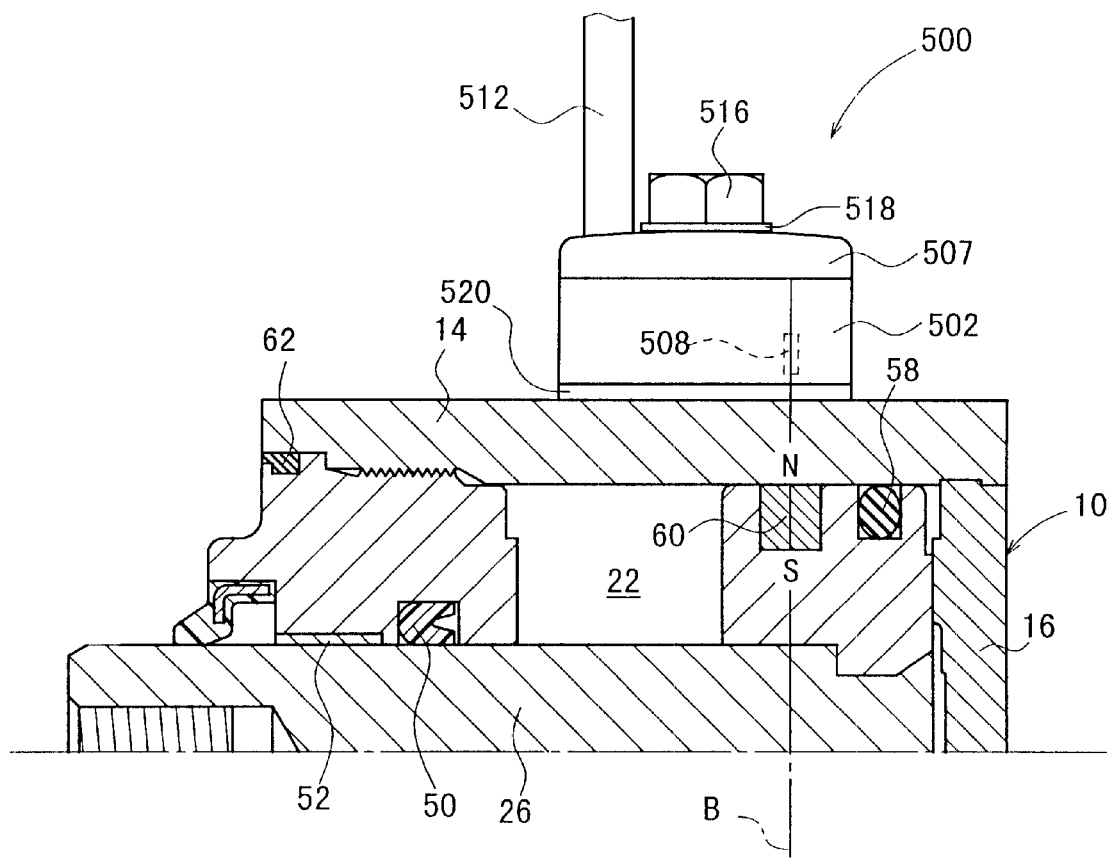
FIG. 29 is a partially omitted longitudinal cross sectional view taken in the axial direction of a cylinder on which the position detecting sensor is mounted.
Figure 31:
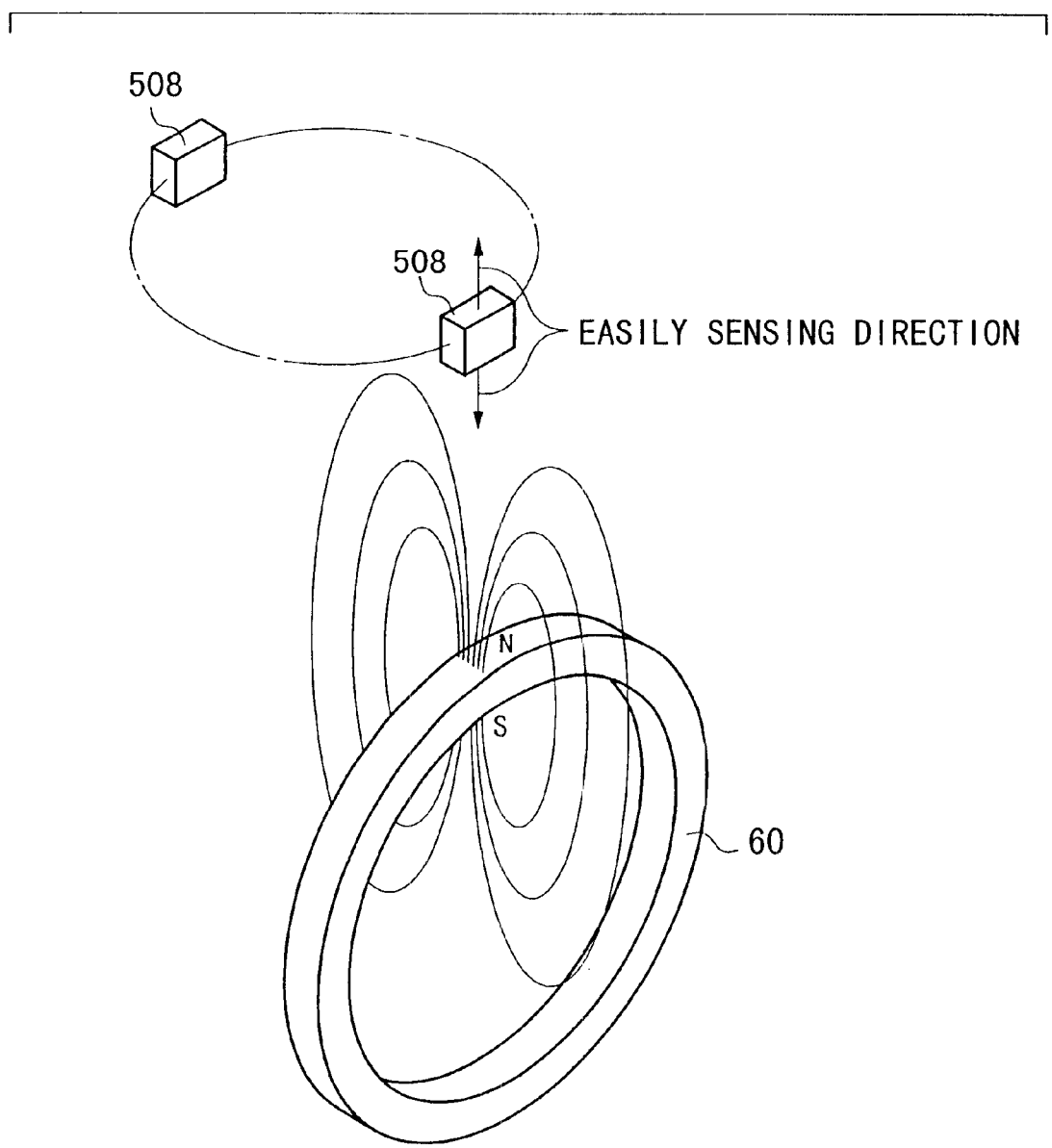
FIG. 31 is an explanatory diagram showing a relation between a detecting element and a magnet, which compose the position detecting sensor.

In this case, the magnet 60 fitted on the outer circumference of the piston 24 is magnetized (or radially magnetized) such that the magnet 60 has the magnetic poles in the radial directions of the piston 24 that an S-pole (or N-pole) may be established on the inner circumferential surface of the ring body whereas an N-pole (or S-pole) may be established on the outer circumferential surface of the ring body (see FIGS. 29 and 31).

Figure 28:
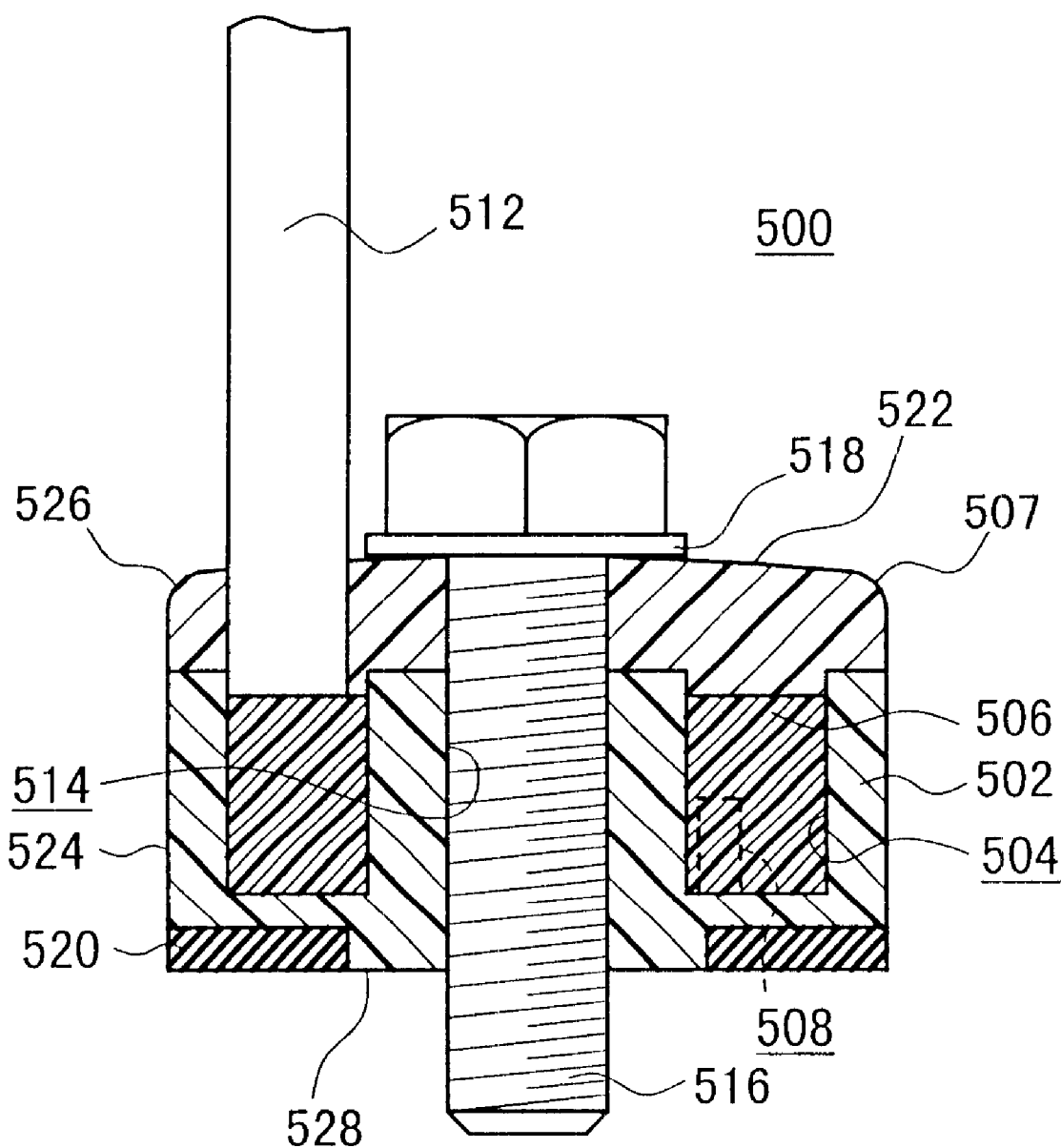
FIG. 28 is a longitudinal cross sectional view taken along line XXVIII—XXVIII of FIG. 27.

This position detecting sensor 500 according to the fifth embodiment comprises, as shown in FIG. 28, a casing 502 formed of a material such as an aluminum alloy, stainless steel or a synthetic resin into a generally disc shape, a resin member 506 made of a resin material such as an epoxy resin and fitted in an annular recess 504 of the casing 502, and a generally disc-shaped cover member 507 fitted on the upper surface of the casing 502 to close the recess 504.

In the resin member 506, an unillustrated substrate is buried. The substrate has a detecting element 508 arranged thereon and is electrically connected to one end portion of a lead wire 512 exposed to the outside of the casing 502. The detecting element 508 is suitably exemplified by one of the non-contact type such as the Hall element or the magnetic-resistance element.

As shown in FIG. 28, through the substantially central portions of the casing 502 and the cover member 507, a mounting hole 514 is extended therethrough, into which a screw member 516 having a hexagonal head is inserted. By loosening the screw member 516 from the side surface of the cylinder 10, the casing 502 and the cover member 507 is circumferentially rotatable on the axis of the screw member 516.

Between the head of the screw member 516 and the upper surface of the cover member 507, a packing 518 is sandwiched for blocking the invasion of the liquid or the like into the mounting hole 514.

Along the circumferential edge portion of the bottom surface of the casing 502, a gasket 520 made of a circular ring member is fitted for blocking the invasion of the liquid or the like into the clearance between the mounting surface of the cylinder 10 and the bottom surface of the casing 502.

The position detecting sensor 500 comprises, as shown in FIG. 28, an upper surface 522 given a predetermined radius of curvature (e.g., R of about 200 mm) and curved convexly outward, a circumferential side surface 524 extending from the upper surface 522, and a chamfered portion 526 formed at the boundary between the upper surface 522 and the side surface 524 and given a predetermined radius of curvature (e.g., R of 1.0 mm).

The upper surface 522 may be suitably formed of a spherical surface having a predetermined radius of curvature, substituting the aforementioned convexly curved surface.

The position detecting sensor 500 according to the fifth embodiment is basically constructed as described hereinbefore, and its actions and effects will be described in the following.

First of all, the position detecting sensor 500 is fitted in the side surface 38b of the cylinder 10 (as should be referred to FIG. 25) by inserting the screw member 516 into the mounting hole 514 of the position detecting sensor 500 and by fastening one end portion of the screw member 516 into the unillustrated threaded hole of the cylinder 10.

In this case, as shown in FIG. 29, the position detecting sensor 500 is arranged such that the detecting element 508 is positioned on a radially output extension B through the (not shown) center of the magnet 60, and the rotary position of the detecting element 508 at this time is set to 0 degree.

Figure 30:
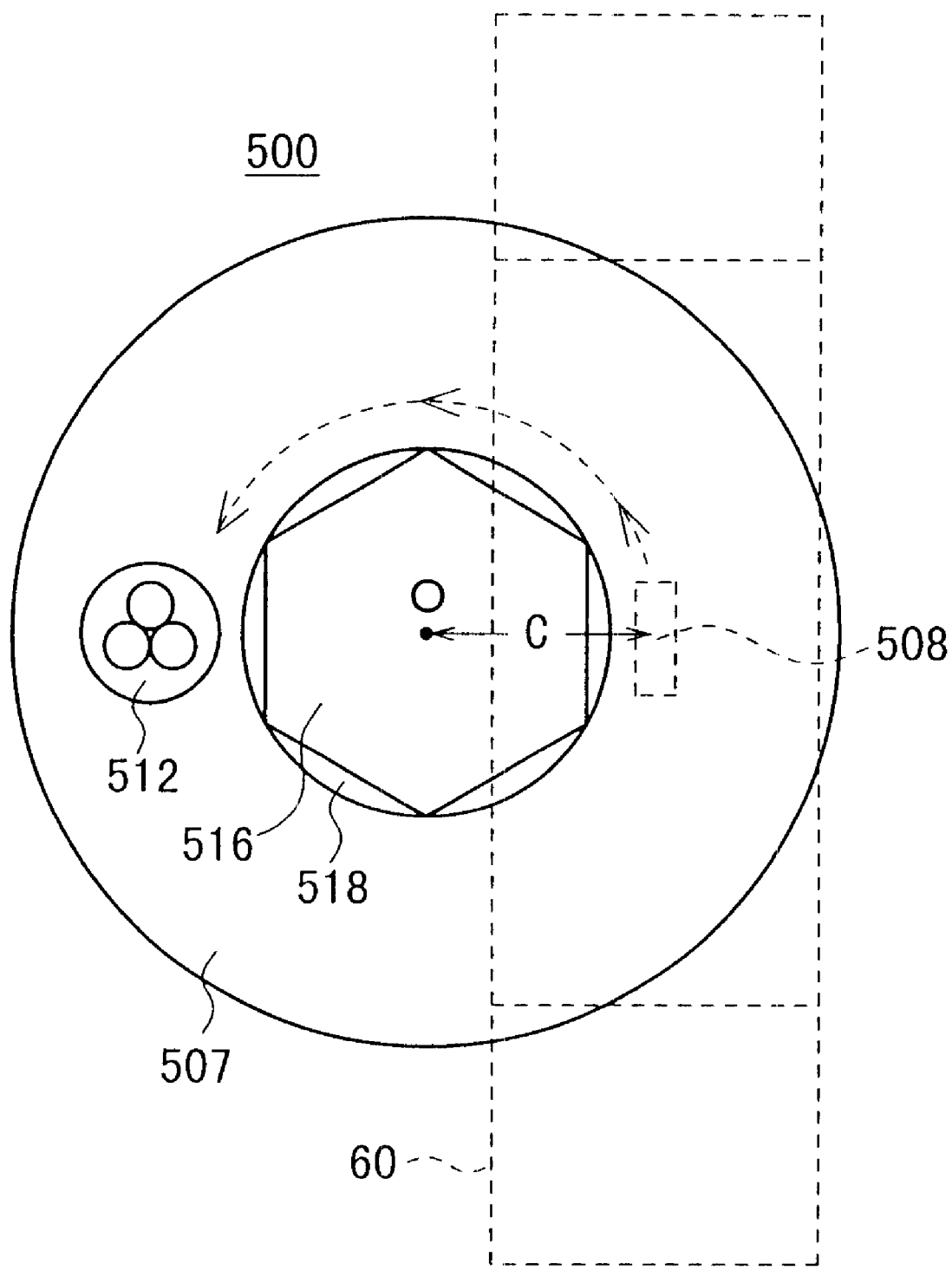
FIG. 30 is a diagram for explaining actions to adjust the detecting position of the position detecting sensor.

Next, as shown in FIG. 30, the position detecting sensor 500 is turned on its center O (or on the axis of the screw member 516) in a predetermined direction to adjust the detecting position of the detecting element 508 to a predetermined position. At this time, the maximum adjustment of the position detecting sensor 500 can be set to a double distance of a radius C from the center O of the position detecting sensor 500 to the detecting element 508 by turning the position detecting sensor 500 circumferentially by about 180 degrees from the rotary position of 0 degrees to the rotary position of 180 degrees.

Subsequently, the pressurized fluid (such as air) is fed from the unillustrated pressurized fluid supply source to the one pressurized fluid inlet/outlet port 12a. The pressurized fluid thus fed to the one pressurized fluid inlet/outlet port 12a is introduced via the passage 32a into the one cylinder chamber 22a to push the piston 24 toward the other cylinder chamber 22b.

When the piston 24 arrives under the action of the pressurized fluid at the displacement terminal position, the magnetic field of the magnet 60, fitted on the piston 24, is detected by the detecting element 508 of the position detecting sensor 500 so that the position detecting sensor 500 outputs a detection signal to an external device such as an unillustrated controller through the lead wire 512 connected with the substrate.

The piston 24 is displaced to return to an initial position by switching the feed of the pressurized fluid from the one pressurized fluid inlet/outlet port 12a to the other pressurized fluid inlet/outlet port 12b under the switching action of an unillustrated directional control valve. Thus, the piston 24, as fitted in the cylinder tube 14, can be reciprocated along the cylinder chamber 22.

In the position detecting sensor 500 according to the fifth embodiment, the detecting element 508 can rotate circumferentially on the center O of the position detecting sensor 500 so that the casing 502 need not be enlarged according to the slide amount of the detecting element 508. The size and weight can be reduced even when a detecting position adjusting mechanism is provided.

In the position detecting sensor 500 according to the fifth embodiment, an effect is obtained that the magnetic field to be generated from the magnet 60 can be reliably detected even when the rotary angle of the detecting element 508 changes, by magnetizing the magnetism of the magnet 60 in the radial directions of the piston 24 (i.e., in a direction generally perpendicular to the axis of the piston rod 26), as shown in FIG. 31, and by setting the easily sensing direction of the detecting element 508 in the radial directions, as shown in FIG. 31.

Figure 32:
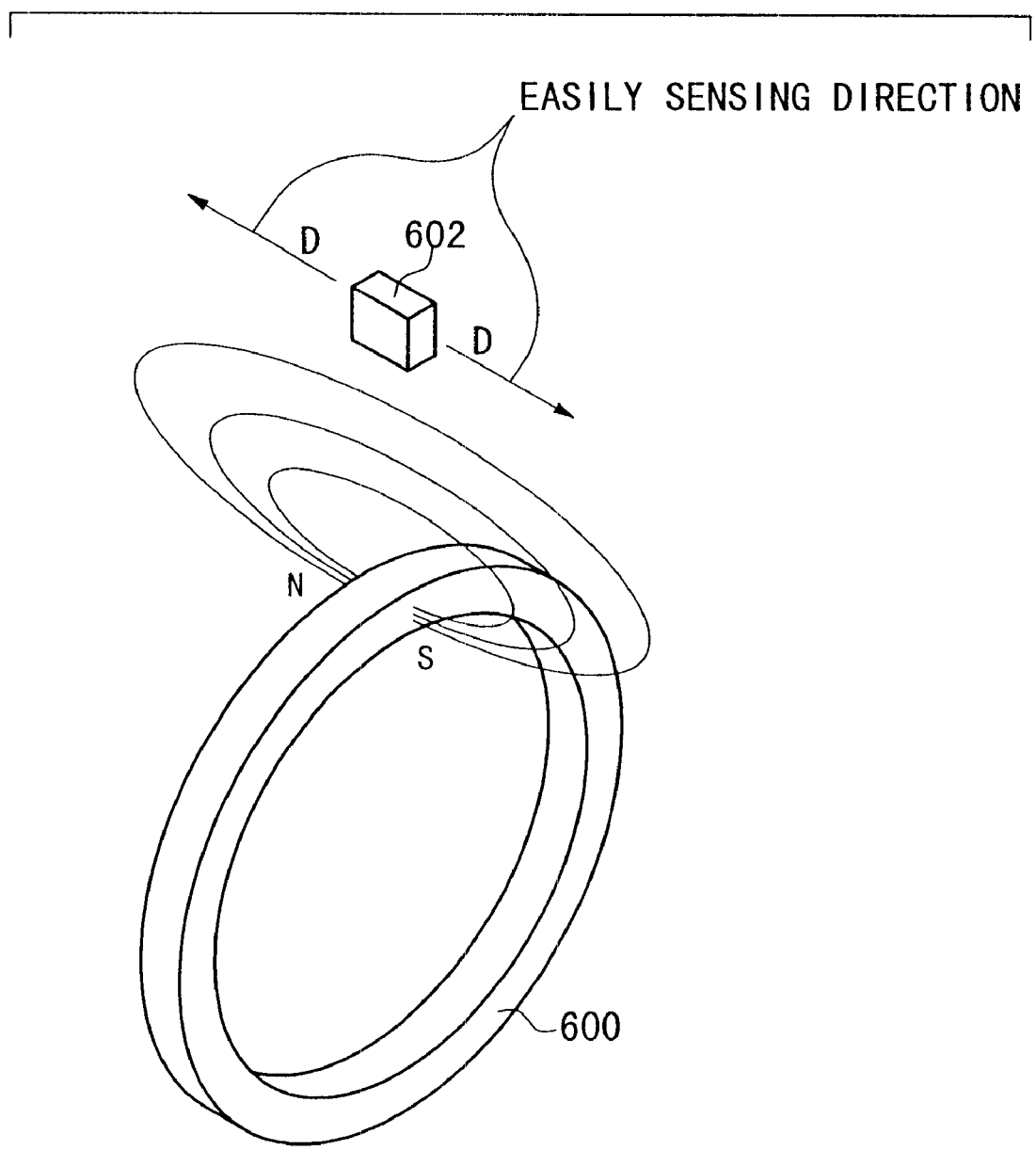
FIG. 32 is an explanatory diagram showing a relation between the detecting element and the magnet in a comparison example.

In FIG. 32, a comparison example is shown in which the magnetic poles of a magnet 600 are magnetized along the axial direction of the piston rod 26 so that a detecting element 602 can be displaced generally in parallel (i.e., in the direction of arrows D) with the axis of the piston rod 26.

This comparison example is troubled in that when the magnetic force is excessively strong (or when the detecting sensitivity of the detecting element 602 is excessively high), the detecting element 602 detects the peak values of a multiplicity of individual magnetic forces so that it malfunctions to be turned ON several times.

On the contrary, the position detecting sensor 500 according to the fifth embodiment is advantageous in that it is enabled to detect the peak of the magnetic force practically as one peak while being not influenced by the strength of the magnetic force or the detection sensitivity of the detecting element 508, by disposing the detecting element 508 rotatably in the circumferential direction on the center O of the position detecting sensor 500 and by magnetizing the magnetic poles of the magnet 60 in the radial directions to generate the magnetic field along the radial directions, as shown in FIG. 31. In other words, the position detecting sensor 500 according to the fifth embodiment can widen the range for setting the magnetic force and the detection sensitivity.

When the magnetic force of the magnet 600, the magnetic poles of which are magnetized in parallel with the axial direction of the piston rod 26, is detected by the position detecting sensor 500 according to the fifth embodiment, this detection of the magnetic force may be difficult depending upon the rotary position of the position detecting sensor 500. Specifically, the magnetic force can be detected when the detecting element 508 is at the rotary positions of 0 degrees or 180 degrees, but is hardly detected when the detecting element 508 is at the rotary position of about 90 degrees.

In the position detecting sensor 500 according to the fifth embodiment, as shown in FIG. 28, the substrate having the detecting element 508 is molded of the resin material or the like to form the resin member 506, which is integrally covered with the casing 502 and the cover member 507.

In the position detecting sensor 500 according to the fifth embodiment, therefore, no clearance for allowing the invasion of the liquid or the like is formed in the casing 502 so that no respiratory action occurs due to the temperature change. It is, therefore, unnecessary to fear the breeding of fungi or bacteria, as might otherwise be caused by the moisture or the like in the casing 502.

There is another advantage that the detecting element 508, the unillustrated substrate, the cover member 507, the casing 502 and so on can be integrally fitted on the cylinder 10 by the screw member 516 to be inserted into the mounting hole 514 formed in the casing 502 and the cover member 507.

Moreover, the position detecting sensor 500 according to the fifth embodiment is advantageous in that the surface areas of the casing 502 and the cover member 507 can be decreased to suppress the total residence sum of the liquid.

When the position detecting sensor 500 according to the fifth embodiment is not employed, the screw hole, as formed in the side surface 38b of the cylinder 10, may be closed by closing means such as a bolt having an unillustrated sealing washer.

The invention has been described on the cases in which the position detecting sensors 100, 200, 300, 400 and 500 according to the first to fifth embodiments are attached to the cylinder 10. However, the invention should not be limited thereto, but the position detecting sensors can naturally be applied to various hydraulic devices or electric actuators such as the unillustrated linear actuator.

What is claimed is:

1. A cylinder including a piston and a piston rod to be integrally displaced along a cylinder chamber under the action of a pressurized fluid fed to said cylinder chamber through pressurized fluid inlet/outlet ports, comprising:

a cylinder tube having a non-cylindrical outer periphery extending in a circumferential direction around said cylinder chamber and a pair of upright surfaces on respective ends of said cylinder tube, said outer periphery of said cylinder tube comprising an upper surface, a pair of sloped surfaces extending from said upper surface, a pair of side surfaces extending from said slopes, and a bottom surface extending to said side surfaces, wherein chamfered portions are formed between said upper surface and said pair of slopes, between said slopes and said side surfaces and between said pair of side surfaces and said bottom surface, respectively, and each of said upper surfaces, said pair of sloped surfaces, said pair of side surfaces and said bottom surface comprises a convexly curved surface having a predetermined radius of curvature.

2. A cylinder including a piston and a piston rod to be integrally displaced along a cylinder chamber under the action of a pressurized fluid fed to said cylinder chamber through pressurized fluid inlet/outlet ports, comprising:

a cylinder tube;

a cover member joined to an end portion of said cylinder tube for forming a cylinder chamber; and a sealing member fitted in a joint portion between said cylinder tube and said cover member, wherein said sealing member has a clamped portion that is squeezed in a radial direction of said cylinder chamber and clamped by an annular ridge formed on one of an inner circumference of said cylinder tube and an outer circumference of said cover member, said clamped portion protruding outwardly from said cover member and said cylinder tube.

3. A position detecting sensor for detecting a position of a piston fitted in a cylinder chamber in a cylinder tube, comprising:

a detecting element for detecting a magnetic field of a magnet fitted on a piston; and a sensor body enclosing said detecting element, wherein:
said sensor body has an outer periphery formed of surfaces curved convexly outward and a chamfered portion;
said sensor body includes a casing having mounting holes formed therethrough in a direction generally perpendicular to a mounting surface for a cylinder; and
a resin member having said detecting element molded therein is integrally fitted in a recess of said casing.

4. A position detecting sensor according to claim 3, further comprising a sealing member mounted on said mounting surface of said sensor body for said cylinder, for blocking invasion of liquid.

5. A position detecting sensor for detecting a position of a piston fitted in a cylinder chamber in a cylinder tube, comprising:

a detecting element for detecting a magnetic field of a magnet fitted on a piston; and a sensor body enclosing said detecting element, wherein said sensor body has an outer periphery formed of surfaces curved convexly outward and a chamfered portion, and further comprising screw members adapted to be inserted into mounting holes for mounting said sensor body on a side surface of said cylinder, wherein sealing members are provided at heads of said screw members for blocking invasion of liquid into said mounting holes.

6. A position detecting sensor for detecting a position of a piston fitted in a cylinder chamber in a cylinder tube, comprising:

a detecting element for detecting a magnetic field of a magnet fitted on a piston; and a sensor body enclosing said detecting element, wherein:
said sensor body has an outer periphery formed of surfaces curved convexly outward and a chamfered portion;
said sensor body includes a casing and a cover member adapted to be removably mounted on said casing;
said casing has slots formed therein and adapted to be engaged by screw members to be screwed in a side surface of a cylinder; and
said casing can be displaced along said slots.

7. A position detecting sensor for detecting a position of a piston fitted in a cylinder chamber in a cylinder tube, comprising:

a detecting element for detecting a magnetic field of a magnet fitted on a piston; and a sensor body enclosing said detecting element, wherein:
said sensor body has an outer periphery formed of surfaces curved convexly outward and a chamfered portion;
said sensor body includes a casing and a cover member adapted to be removably mounted on said casing;
a rail member is fixed in a chamber which is defined by said casing and said cover member; and
a sensor portion including a detecting element can be displaced along a recess extending in an axial direction of said rail member.

8. A position detecting sensor for detecting a position of a piston fitted in a cylinder chamber in a cylinder tube, comprising:

a detecting element for detecting a magnetic field of a magnet fitted on a piston; and a sensor body enclosing said detecting element, wherein:
said sensor body has an outer periphery formed of surfaces curved convexly outward and a chamfered portion;
said sensor body comprises a casing having mounting holes formed therethrough in a direction generally perpendicular to a mounting surface for a cylinder;
a rail member is mounted in a groove portion of said casing; and
a sensor portion including a detecting element can be displaced along a recess extending in an axial direction of said rail member.

9. A position detecting sensor for detecting a position of a piston fitted in a cylinder chamber in a cylinder tube, comprising:

a detecting element for detecting a magnetic field of a magnet fitted on a piston;

a sensor body enclosing said detecting element; and a detecting position adjusting mechanism adapted to be rotated circumferentially on a center of said sensor body, for adjusting a detecting position of said detecting element.

10. A position detecting sensor according to claim 9, wherein said magnet comprises a ring member fitted on said piston so that magnetic poles are established on a radially larger outer circumference and a radially smaller inner circumference of said ring member by magnetizing said ring member in radial directions.

11. A position detecting sensor according to claim 9, wherein:

said sensor body includes a casing formed generally into a disc shape, a generally disc-shaped cover member for closing a recess formed in said casing, and a screw member adapted to be inserted into a mounting hole formed through said casing and said cover member; and said casing and said cover member are made integrally rotatable in a circumferential direction on an axis of said screw member.

12. A position detecting sensor according to claim 11, wherein:

said detecting element and a substrate are fitted as a resin member molded of a resin material in an annular recess formed in said casing; and said detecting element is made rotatable integrally with said casing in the circumferential direction.

13. A position detecting sensor according to claim 11, further comprising:

a sealing member sandwiched between said cover member and a head of said screw member, for blocking invasion of a liquid or the like into said mounting hole.

14. A position detecting sensor according to claim 11, further comprising:

a sealing member mounted on a bottom surface of said casing, for retaining liquid-tightness of a mounting surface for said cylinder.

15. A position detecting sensor according to claim 9, wherein:

said sensor body has an outer periphery formed of either surfaces curved convexly outward or a spherical surface and a chamfered portion.

* * * * *